US012634389B2

(12) United States Patent (10) Patent No.: US 12,634,389 B2
Sim et al. (45) Date of Patent: May 19, 2026

(54) ELECTRONIC DEVICE FOR PROCESSING PLURALITY OF PIECES OF INFORMATION, AND OPERATING METHOD THEREFOR

(71) Applicant: Samsung Electronics Co., Ltd., Suwon-si (KR)

(72) Inventors: Sangman Sim, Suwon-si (KR); Taewon Kwak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 317 days.

(21) Appl. No.: 18/428,605

(22) Filed: Jan. 31, 2024

(65) Prior Publication Data

US 2024/0179234 A1 May 30, 2024

Related U.S. Application Data

(63) Continuation of application No. PCT/KR2022/009528, filed on Jul. 1, 2022.

(30) Foreign Application Priority Data

Aug. 6, 2021 (KR) ........................ 10-2021-0103783

(51) Int. Cl.
*H04M 1/27457* (2020.01)
*H04M 1/2757* (2020.01)
(52) U.S. Cl.
CPC ..... *H04M 1/27457* (2020.01); *H04M 1/2757* (2020.01)
(58) Field of Classification Search
CPC ........... H04M 1/27457; H04M 1/2757; H04M 1/725; H04M 2201/34; H04M 2201/36
See application file for complete search history.

(56) References Cited

U.S. PATENT DOCUMENTS 6,507,874 B1 1/2003 Tuniman et al.
8,489,076 B2 * 7/2013 Kim .................... H04M 1/2747
455/414.1
(Continued)

FOREIGN PATENT DOCUMENTS

CN 10-2007-0030516 A 3/2007
CN 10-2008-0037260 A 4/2008
(Continued)

OTHER PUBLICATIONS

Korean Office Action dated Sep. 8, 2025, issued in a Korean Patent Application No. 10-2021-0103783.
(Continued)

*Primary Examiner* — Curtis A Kuntz
(74) *Attorney, Agent, or Firm* — Jefferson IP Law, LLP

(57) ABSTRACT

An electronic device includes a communication circuit, an interface, a processor, and memory storing instructions that, when executed by the at least one processor, cause the electronic device to, obtain a plurality of pieces of third contact information based on a plurality of pieces of first contact information received from an external device and a plurality of pieces of identified second contact information stored in a subscriber identification module (SIM) card, identify a plurality of pieces of tag information corresponding to the plurality of pieces of third contact information, receive an input for selecting a first parameter from among the plurality of pieces of parameters, identify at least one piece of first tag information, obtain a plurality of pieces of fifth contact information based on at least one piece of fourth contact information, and provide remaining pieces of contact information other than at least one piece of fourth contact information.

20 Claims, 21 Drawing Sheets

(56)     References Cited

U.S. PATENT DOCUMENTS

| | | | | |
|---|---|---|---|---|
| 9,569,067 | B2 * | 2/2017 | Jung ................. | H04M 1/27457 |
| 10,677,125 | B2 * | 6/2020 | Ono ...................... | F01N 3/0814 |
| 2012/0052848 | A1 | 3/2012 | Kim | |
| 2013/0149989 | A1 | 6/2013 | Kwon et al. | |
| 2015/0072673 | A1 | 3/2015 | Yang | |
| 2017/0344436 | A1 | 11/2017 | Bombacino et al. | |
| 2019/0114371 | A1 | 4/2019 | Southgate | |
| 2019/0132435 | A1 * | 5/2019 | Richardson ......... | H04M 3/4931 |
| 2020/0073762 | A1 | 3/2020 | Bombacino et al. | |

FOREIGN PATENT DOCUMENTS

| | | | | | |
|---|---|---|---|---|---|
| CN | 10-2013-0063839 | A | | 6/2013 | |
| CN | 103200293 | A | | 7/2013 | |
| CN | 108574758 | A | | 9/2018 | |
| KR | 101104700 | B1 * | | 1/2012 | |
| KR | 10-1711972 | B1 | | 3/2017 | |
| KR | 10-2013-0087866 | A | | 8/2023 | |
| WO | WO-2015024387 | A1 * | 2/2015 | ......... | G06F 3/04883 |

OTHER PUBLICATIONS

International Search Report dated Oct. 11, 2022, issued in International Patent Application No. PCT/KR2022/009528.

* cited by examiner

Figure 4:
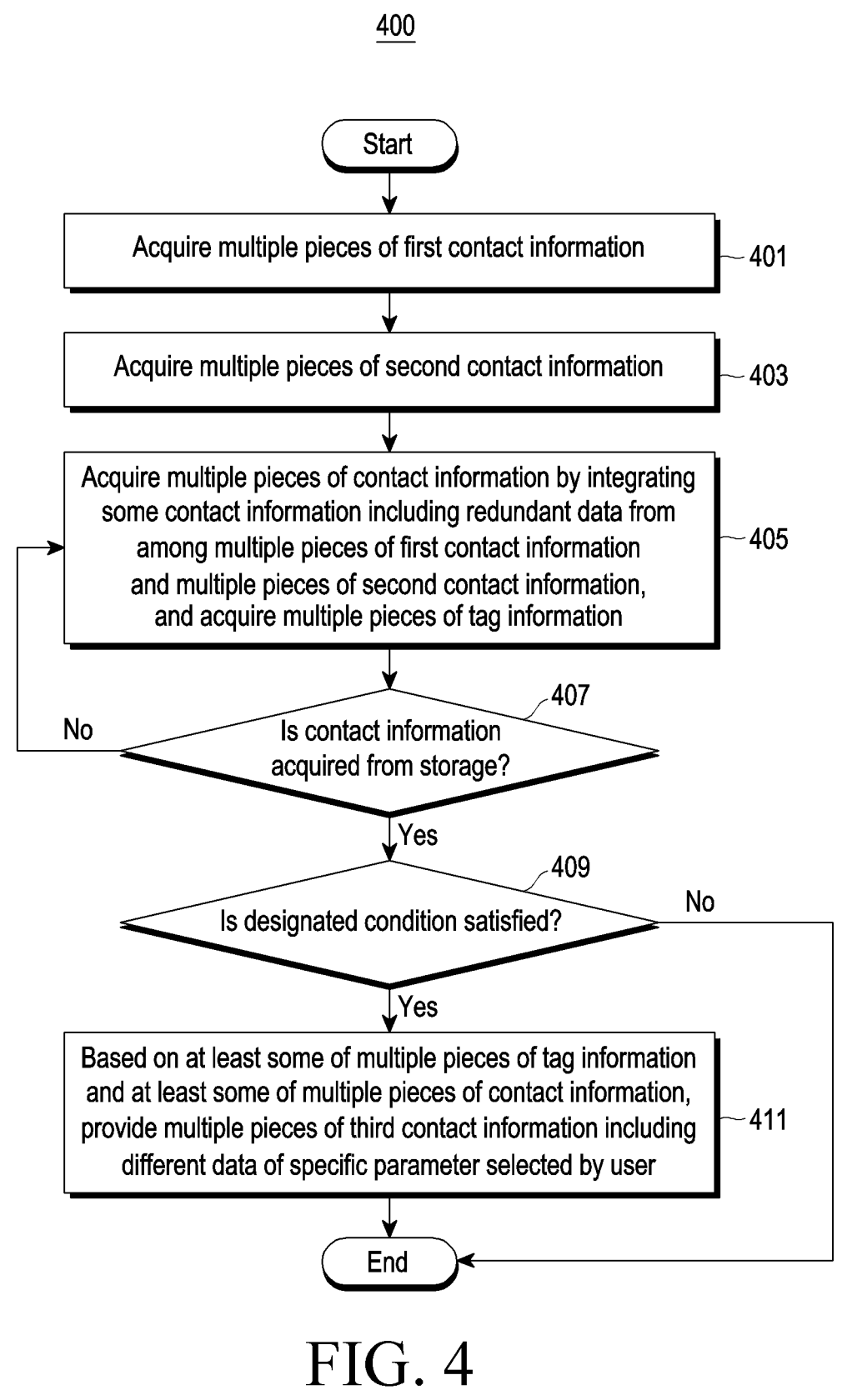

400

Start

Acquire multiple pieces of first contact information     401

Acquire multiple pieces of second contact information     403

Acquire multiple pieces of contact information by integrating some contact information including redundant data from among multiple pieces of first contact information and multiple pieces of second contact information, and acquire multiple pieces of tag information     405

407

No     Is contact information acquired from storage?

Yes

409

Is designated condition satisfied?     No

Yes

Based on at least some of multiple pieces of tag information and at least some of multiple pieces of contact information, provide multiple pieces of third contact information including different data of specific parameter selected by user     411

End

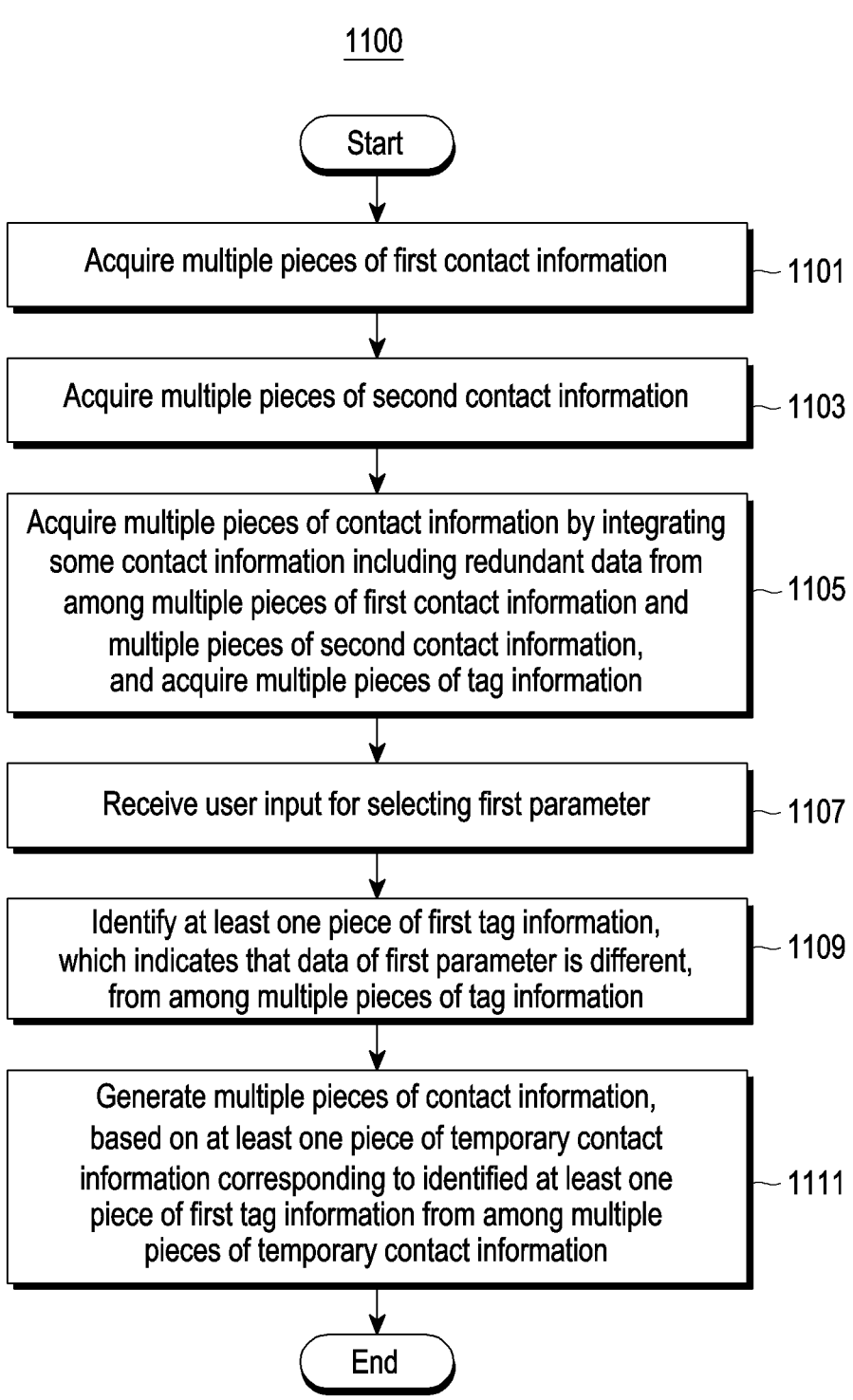

1100

Start

Acquire multiple pieces of first contact information ~ 1101

Acquire multiple pieces of second contact information ~ 1103

Acquire multiple pieces of contact information by integrating some contact information including redundant data from among multiple pieces of first contact information and multiple pieces of second contact information, and acquire multiple pieces of tag information ~ 1105

Receive user input for selecting first parameter ~ 1107

Identify at least one piece of first tag information, which indicates that data of first parameter is different, from among multiple pieces of tag information ~ 1109

Generate multiple pieces of contact information, based on at least one piece of temporary contact information corresponding to identified at least one piece of first tag information from among multiple pieces of temporary contact information ~ 1111

End

FIG. 11

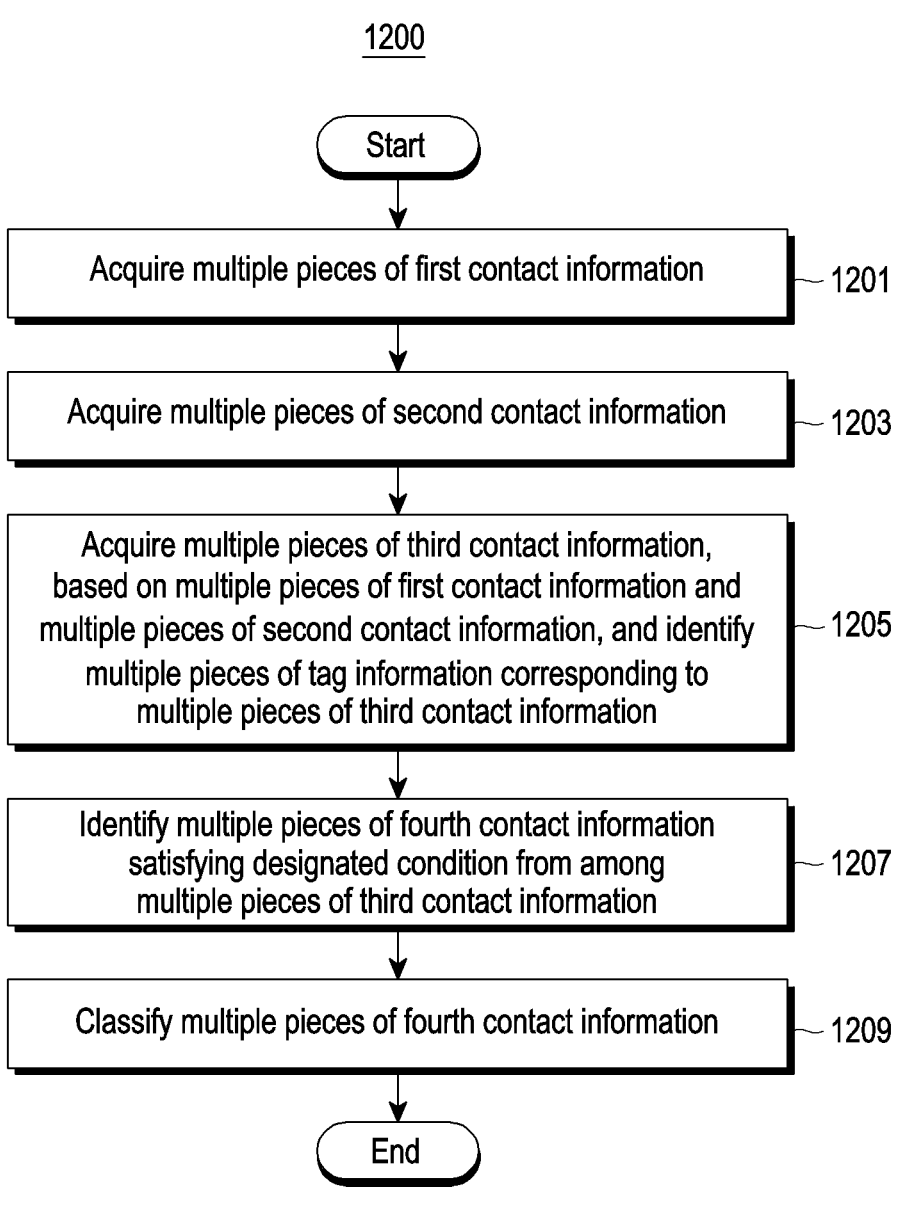

1200

Start

Acquire multiple pieces of first contact information ～1201

Acquire multiple pieces of second contact information ～1203

Acquire multiple pieces of third contact information, based on multiple pieces of first contact information and multiple pieces of second contact information, and identify multiple pieces of tag information corresponding to multiple pieces of third contact information ～1205

Identify multiple pieces of fourth contact information satisfying designated condition from among multiple pieces of third contact information ～1207

Classify multiple pieces of fourth contact information ～1209

End

FIG. 12

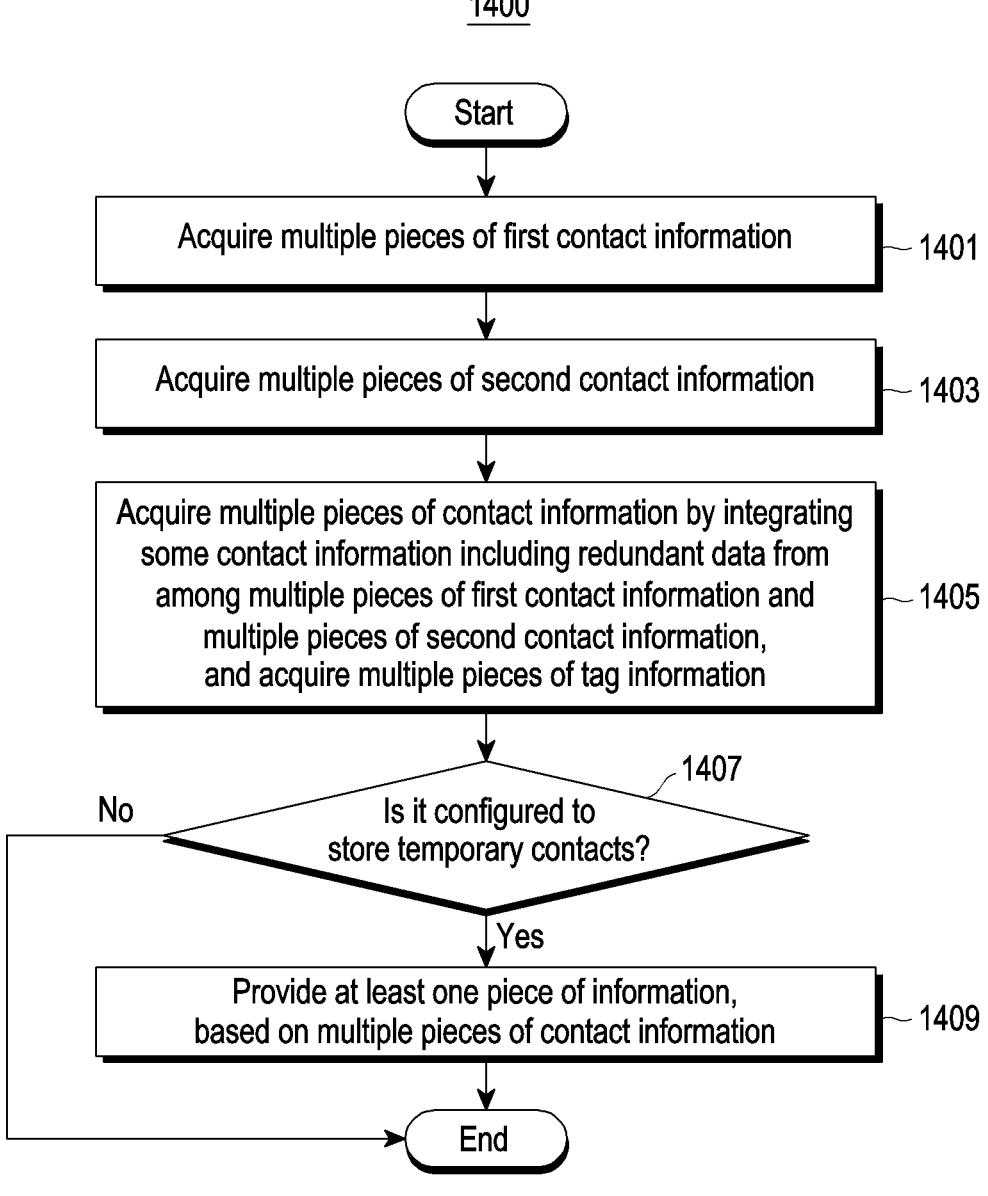

1400

Start

Acquire multiple pieces of first contact information ~ 1401

Acquire multiple pieces of second contact information ~ 1403

Acquire multiple pieces of contact information by integrating some contact information including redundant data from among multiple pieces of first contact information and multiple pieces of second contact information, and acquire multiple pieces of tag information ~ 1405

1407

No          Is it configured to store temporary contacts?

Yes

Provide at least one piece of information, based on multiple pieces of contact information ~ 1409

End

FIG. 14

ELECTRONIC DEVICE FOR PROCESSING PLURALITY OF PIECES OF INFORMATION, AND OPERATING METHOD THEREFOR

CROSS-REFERENCE TO RELATED APPLICATION(S)

This application is a continuation application, claiming priority under § 365(c), of an International application No. PCT/KR2022/009528, filed on Jul. 1, 2022, which is based on and claims the benefit of a Korean patent application number 10-2021-0103783, filed on Aug. 6, 2021, in the Korean Intellectual Property Office, the disclosure of which is incorporated by reference herein in its entirety.

BACKGROUND

1. Field

The disclosure relates to an electronic device for processing multiple pieces of information and an operation method therefor.

2. Description of Related Art

With the rapid development of electronic devices in recent years, electronic devices capable of wireless voice calls and information exchange have become necessities of life. In the early stage of the spread of such electronic devices, the electronic devices were simply recognized as being portable and capable of making wireless calls. However, with the development of the technology and the introduction of the wireless Internet, electronic devices not only are used for the purpose of simply making calls or managing schedules, but their utilization range has expanded to include functions, such as games, a remote-controller using short-distance communication, and image capturing using a built-in digital camera, so as to satisfy needs of users.

As the usability of electronic devices becomes more important, a service for backing up, in storage media, information stored in the electronic devices and recovering the same is provided. More particularly, when purchasing a new electronic device, a service for recovering contact information is being provided.

Accordingly, the technology for managing information restored to an electronic device from various types of storage media needs to be implemented.

The above information is presented as background information only to assist with an understanding of the disclosure. No determination has been made, and no assertion is made, as to whether any of the above might be applicable as prior art with regard to the disclosure.

SUMMARY

A user backs up (or stores) information (e.g., contact information) of an electronic device in various types of storage media, such as a storage device (e.g., a subscriber identification module (SIM) card or memory) of the electronic device and an external server. Accordingly, a new electronic device (or another electronic device) of the user uses information of the electronic device by receiving information from each of the storage media. However, at least some of the information that the new device receives from the various types of storage media is redundant information including identical data. Due to the redundant information, it is difficult for the user to identify necessary information, and since unnecessary information (e.g., at least some of the redundant information) is stored in the new electronic device, information management in the new device is not easy (or the operation burden of the electronic device for management increases). In addition, if the redundant information is integrated and managed as one piece of information due to a mistake of the user and/or an error (or a bug or a policy problem) of the electronic device, it is difficult to separate, into multiple pieces of information, the information managed in the integrated manner (or the operation burden of the electronic device for separation into multiple pieces of the information increases).

Aspects of the disclosure are to address at least the above-mentioned problems and/or disadvantages and to provide at least the advantages described below. Accordingly, an aspect of the disclosure is to provide an electronic device and an operation method thereof. Information is received from each of various types of media, and information, in which at least some data are redundant, among the received multiple pieces of information is integrated based on a specific parameter, thereby improving facilitation of information management.

Another aspect of the disclosure is to provide an electronic device and an operation method thereof, when multiple pieces of information are integrated and managed, tag information is generated for each of the multiple pieces of information, and the integrated information can be separated into multiple pieces of information, based on the generated tag information, thereby improving facilitation of information management.

Additional aspects will be set forth in part in the description which follows and, in part, will be apparent from the description, or may be learned by practice of the presented embodiments.

In accordance with an aspect of the disclosure, an electronic device is provided. The electronic device includes at least one communication circuit, an interface configured to be connected to a SIM card and/or a storage device card loaded in the electronic device, one or more processors operatively connected to the at least one communication circuit and the interface, and memory storing instructions that, when executed by the at least one processor, cause the electronic device to, receive a plurality of pieces of first contact information from an external device via the at least one communication circuit, identify a plurality of pieces of second contact information stored in the SIM card via the interface, based on the plurality of pieces of first contact information and the plurality of pieces of second contact information, acquire a plurality of pieces of third contact information, wherein the plurality of pieces of third contact information include at least one piece of contact information acquired based on contact information including identical data among the plurality of pieces of first contact information and the plurality of pieces of second contact information, identify a plurality of pieces of tag information corresponding to the plurality of pieces of third contact information, wherein the plurality of pieces of tag information indicate whether each of a plurality of parameters associated with the plurality of pieces of third contact information has a plurality of data, receive an input for selecting a first parameter from among the parameters, identify, among the plurality of pieces of tag information, at least one piece of first tag information indicating that the first parameter has a plurality of data, acquire a plurality of pieces of fifth contact information, based on at least one piece of fourth contact information corresponding to the at least one piece of first tag information from among the plurality of pieces of third contact information, and provide contact information remaining after excluding the at least one piece of fourth contact information from among the plurality of pieces of third contact information, and the plurality of pieces of fifth contact information.

In accordance with another aspect of the disclosure, a method of operating an electronic device is provided. The method includes receiving a plurality of pieces of first contact information from an external device via at least one communication circuit of the electronic device, receiving a plurality of pieces of second contact information stored in a SIM card of the electronic device via an interface of the electronic device, based on the plurality of pieces of first contact information and the plurality of pieces of second contact information, acquiring pieces of third contact information, wherein the plurality of pieces of third contact information include at least one piece of contact information acquired based on contact information including identical data among the plurality of pieces of first contact information and the plurality of pieces of second contact information, identifying a plurality of pieces of tag information corresponding to the plurality of pieces of third contact information, wherein the plurality of pieces of tag information indicate whether each of parameters associated with the plurality of pieces of third contact information has data, identifying an input for selecting a first parameter from among the plurality of parameters, identifying, among the plurality of pieces of tag information, at least one piece of first tag information indicating that the first parameter has a plurality of data, acquiring a plurality of pieces of fifth contact information, based on at least one piece of fourth contact information corresponding to the at least one piece of first tag information from among the plurality of pieces of third contact information, and providing contact information remaining after excluding the at least one piece of fourth contact information from among the plurality of pieces of third contact information, and the plurality of pieces of fifth contact information.

In accordance with another aspect of the disclosure, an electronic device is provided. The electronic device includes at least one communication circuit, an interface configured to be connected to a SIM card and/or a storage device card loaded in the electronic device, one or more processors operatively connected to the at least one communication circuit and the interface, and memory storing instructions that, when executed by the at least one processor, cause the electronic device to, acquire a plurality of pieces of contact information, based on the at least one communication circuit and the SIM card, identify, among the plurality of pieces of contact information, first contact information including a plurality of different data corresponding to a specific parameter selected by a user, acquire a plurality of pieces of second contact information including the respective a plurality of different data included in the identified first contact information, and provide the plurality of pieces of second contact information.

In accordance with another aspect of the disclosure, one or more non-transitory computer-readable storage media storing computer-executable instructions that, when executed by at least one processor of an electronic device, cause the electronic device to perform operations are provided. The operations include receiving a plurality of pieces of first contact information from an external device via at least one communication circuit of the electronic device, receiving a plurality of pieces of second contact information stored in a subscriber identification module (SIM) card of the electronic device via an interface of the electronic device, based on the plurality of pieces of first contact information and the plurality of pieces of second contact information, acquiring a plurality of pieces of third contact information, wherein the plurality of pieces of third contact information comprise at least one piece of contact information acquired based on contact information comprising identical data among the plurality of pieces of first contact information and the plurality of pieces of second contact information, identifying a plurality of pieces of tag information corresponding to the plurality of pieces of third contact information, wherein the plurality of pieces of tag information indicate whether each of a plurality of parameters associated with the plurality of pieces of third contact information has a plurality of data, identifying an input for selecting a first parameter from among the plurality of parameters, identifying, among the plurality of pieces of tag information, at least one piece of first tag information indicating that the first parameter has a plurality of data, acquiring a plurality of pieces of fifth contact information, based on at least one piece of fourth contact information corresponding to the at least one piece of first tag information from among the plurality of pieces of third contact information, and providing contact information remaining after excluding the at least one piece of fourth contact information from among the plurality of pieces of third contact information, and the plurality of pieces of fifth contact information.

Task solutions according to various embodiments are not limited to the solutions described above, and solutions that are not mentioned are clearly understood by those skilled in the art, to which the disclosure belongs to, based on the specification and the appended drawings.

According to various embodiments of the disclosure, the disclosure can provide an electronic device and an operation method thereof, in which information is received from each of various types of media, and information, in which at least some data are redundant, among the received multiple pieces of information is integrated based on a specific parameter, thereby improving facilitation of information management.

In addition, according to various embodiment of the disclosure s, the disclosure can provide an electronic device and an operation method thereof, in which, when multiple pieces of information are integrated and managed, tag information is generated for each of the multiple pieces of information, and the integrated information can be separated into multiple pieces of information, based on the generated tag information, thereby improving facilitation of information management.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a flowchart for illustrating an operation of an electronic device according to an embodiment of the disclosure;

FIG. 11 is a flowchart for illustrating an operation of an electronic device according to an embodiment of the disclosure;

FIG. 12 is a flowchart for illustrating an operation of an electronic device according to an embodiment of the disclosure;

FIG. 14 is a flowchart for illustrating an operation of an electronic device according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
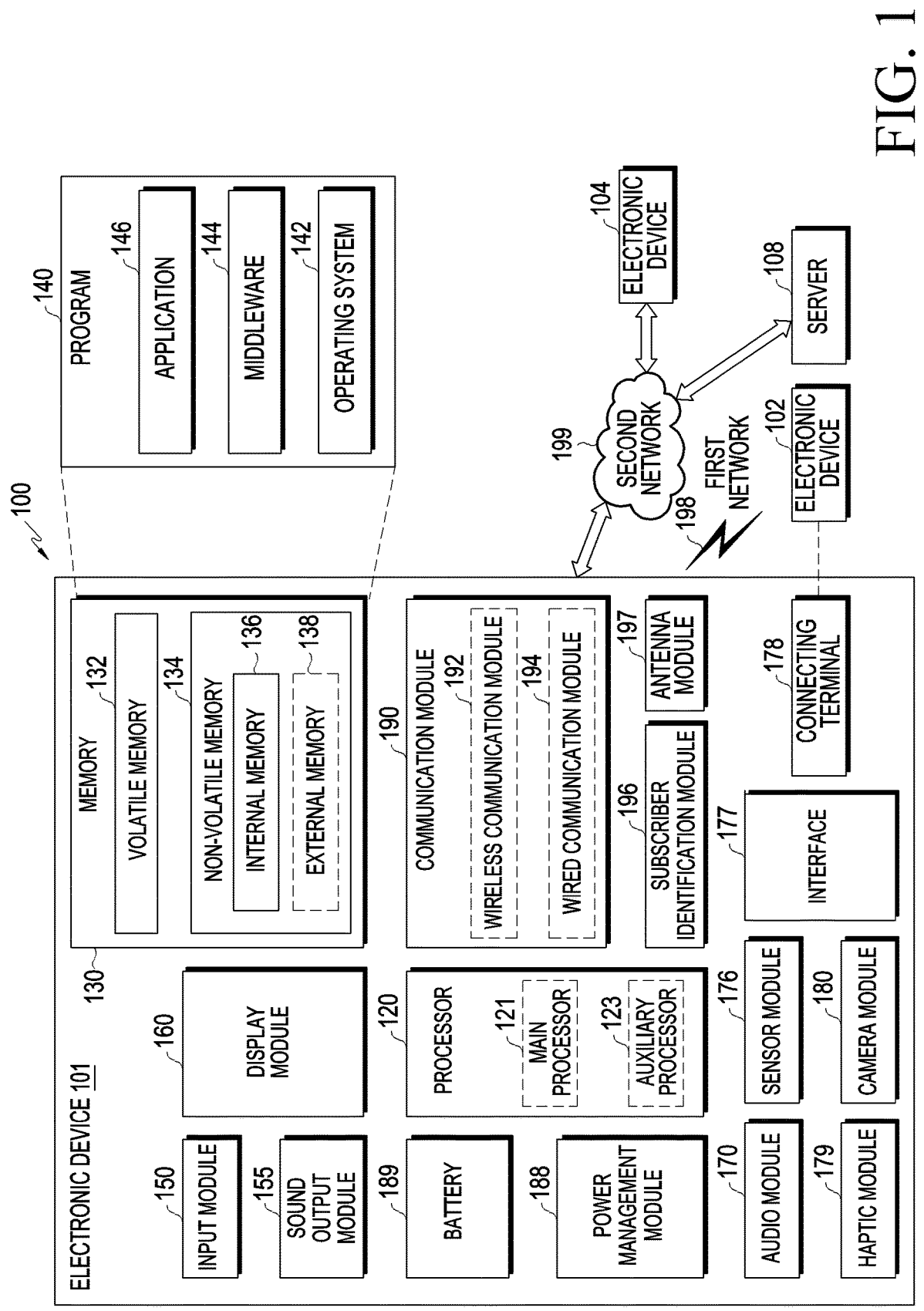
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers.

The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an Internet-of-things (IOT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
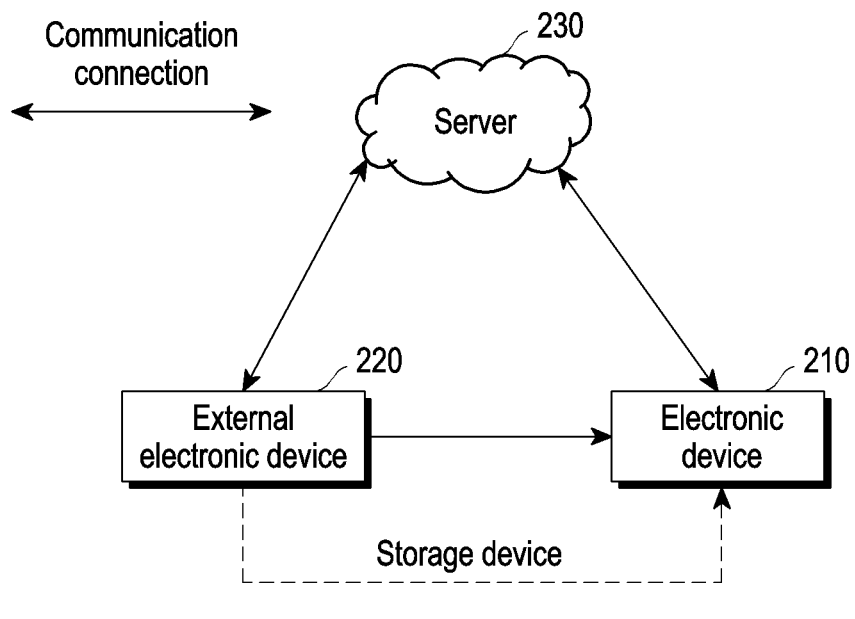
FIG. 2 is a diagram illustrating devices (e.g., an electronic device, an external electronic device, and a server) according to an embodiment of the disclosure.

FIG. 2 is a diagram illustrating devices (e.g., an electronic device, an external electronic device, and a server) according to an embodiment of the disclosure.

Referring to FIG. 2, description will be provided for an example of devices (e.g., an electronic device 210, an external electronic device 220, and a server 230) according to various embodiments.

Since the description of the electronic device 101 described in FIG. 1 may be applied to the description of the following devices (e.g., the electronic device, the external electronic device, and the server), redundant description will be skipped.

According to various embodiments of the disclosure, FIG. 2 is a diagram illustrating an example of devices (e.g., the electronic device 210, the external electronic device 220, and the server 230).

According to various embodiments of the disclosure, referring to FIG. 2, the devices may include the electronic device 210, the external electronic device 220, and/or the server 230. The disclosure is not limited to the description and/or illustration above, and more devices may be implemented (or provided).

For example, the electronic device 210 and the external electronic device 220 may be personal electronic devices used by a user. For example, the electronic device 210 and the external electronic device 220 may include types of terminals, such as a smart phone, a tablet PC, and a laptop. The electronic device 210 and the external electronic device 220 may be the same type of terminal, or may be different types of terminals. In addition, the external electronic device 220 may be a device that the user has previously used, and the electronic device 210 may be a newly used device. However, the disclosure is not limited to the description, and the electronic device 210 and the external electronic device 220 may be electronic devices that the user is using at the same time. Each of the electronic device 210 and the external electronic device 220 may back up (or store) information in storage media (e.g., a storage device and/or the server 220).

In another example, the server 230 may be the remote electronic device 210 implemented to accumulate information received from the personal electronic device 210 used by the user. In another example, the server 230 may be a remote server implemented to store information, such as a cloud server, a database server, a file server, and a web server. The server 230 may include multiple servers, and may configure a user account for each of the multiple servers and manage information, based on the configured account. For example, the server 230 may be an account server.

According to various embodiments of the disclosure, the electronic device 210 may receive (or download, acquire, or recover) information stored (accumulated or backed up) in the external devices (e.g., the external electronic device 220 and/or the server 230).

In an embodiment of the disclosure, the electronic device 210 may establish communication connections to the external devices (e.g., the external electronic device 220 and/or the server 230) by using at least one communication circuit and may receive information stored in the external devices from the external devices (e.g., the external electronic device 220 and/or the server 230), based on the established communication connections. For example, the electronic device 210 may establish a communication connection (e.g., Bluetooth, Wi-Fi direct, or mobile hotspot communication) to the external electronic device 220, and may receive information stored in the external electronic device 220 via the short-distance communication. In another example, the electronic device 210 may establish a communication connection to the remote server 230, request information stored in the server 230 from the server 230, and receive the information from the server 230. The server 230 may manage (e.g., accumulate (or store) or transmit (or provide)) information, based on an account of the user using the electronic device 210. When the electronic device 210 and/or the external electronic device 220 are connected, the server 230 may receive authentication information (e.g., an ID and/or a password) of the user from the electronic device 210 and/or the external electronic device 220 and may authenticate the user, based on the authentication information. The server 230 may identify the account of the user, based on the authentication. When information is received from the electronic device 210 and/or the external electronic device 220, the server 230 may store (or accumulate) the information to be associated with the identified account. When a request for providing information is received from the electronic device 210, the server 230 may identify an account associated with the electronic device 210, and transmit stored information associated with the identified account to the electronic device 210. If the server 230 includes multiple servers, the respective multiple servers may configure different accounts for the user of the electronic device 210, and manage information for each of the accounts.

In another embodiment of the disclosure, the electronic device 210 may acquire information stored in the external devices (e.g., the external electronic device 220 and/or the server 230) from the storage device (e.g., a SIM card or a storage medium) of the external electronic device 220.

According to various embodiments of the disclosure, information provided to the electronic device 210 from the external devices may include various types of information. For example, the various types of information may include at least one of contact information, SMS information, location information, calendar information, an image, or voice information. However, the disclosed is not limited to the description, and the information may further include types of information that can be stored in the devices (e.g., the electronic device 210, the external electronic device 220, and/or the server 230).

Hereinafter, for convenience of description, an example in which the electronic device 210 acquires (or receives or recovers) contact information is described. However, the description for operations of the devices (e.g., the electronic device 210, the external electronic device 220, and/or the server 230) below may also be applied to an operation of the electronic device 210 to acquire other types of information, which is obvious to those skilled in the art.

Hereinafter, description will be provided for an example of elements of the electronic device 210 according to various embodiments. The description of the elements of the electronic device 101 described in FIG. 1 may be applied to the elements of the electronic device 210. In addition, the description for the elements of the electronic device 210 described below may be applied to the description of the elements of the external electronic device 220.

Figure 3A:
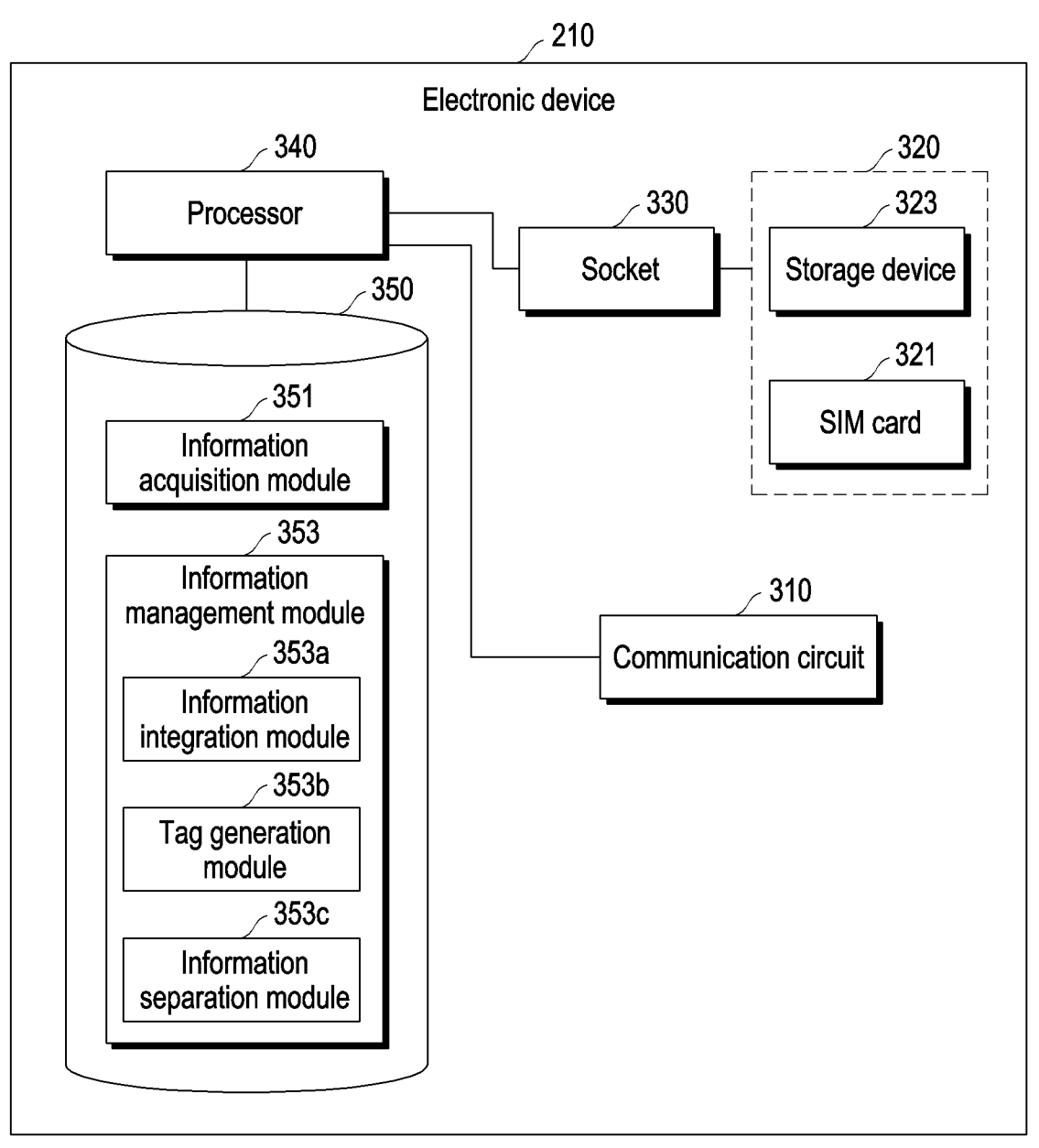
FIG. 3A is a diagram illustrating elements of an electronic device according to an embodiment of the disclosure.

FIG. 3A is a diagram illustrating elements of an electronic device according to an embodiment of the disclosure. Hereinafter, FIG. 3A will be described with reference to FIGS. 3B and 3C.

Figure 3B:
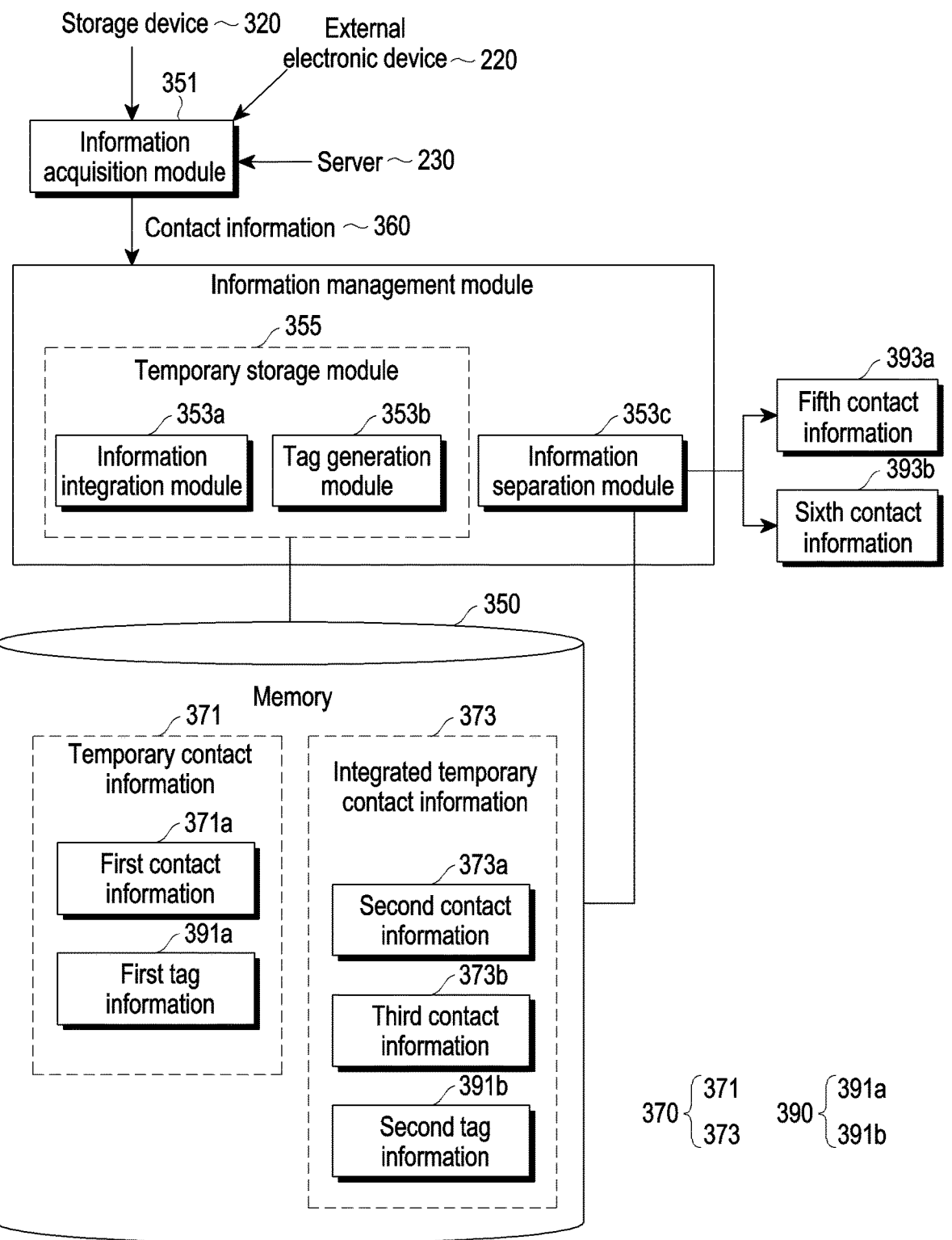
FIG. 3B is a diagram illustrating an operation for integrating information (e.g., contact information) of an electronic device and separating integrated information, based on tag information according to an embodiment of the disclosure.

FIG. 3B is a diagram illustrating an operation for integrating information (e.g., contact information) of an electronic device and separating integrated information, based on tag information according to an embodiment of the disclosure.

Figure 3C:
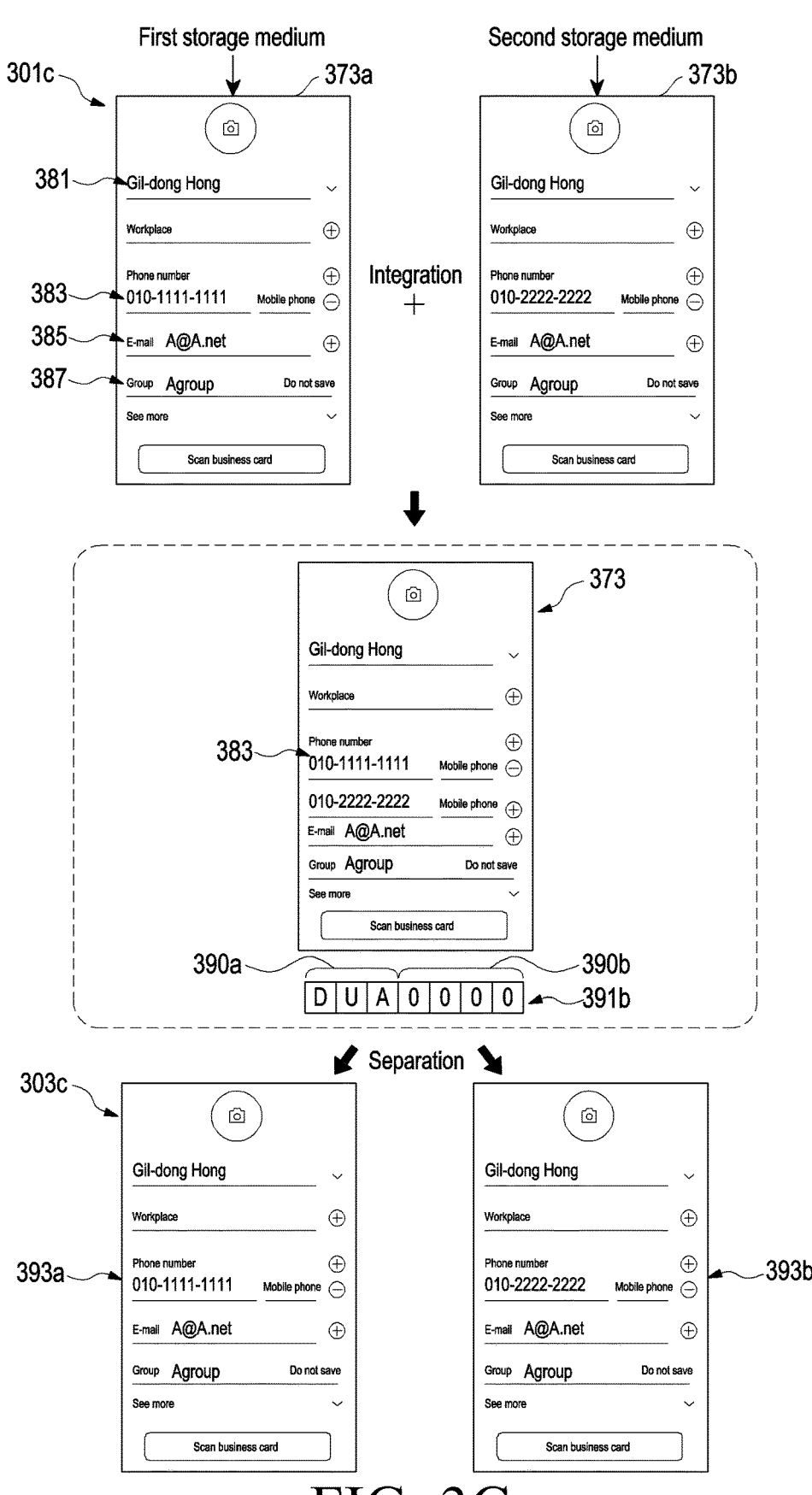
FIG. 3C is a diagram illustrating information integration and information separation based on tag information according to an embodiments of the disclosure

FIG. 3C is a diagram illustrating information integration and information separation based on tag information according to an embodiment of the disclosure.

Referring to FIG. 3A, the electronic device 210 may include a communication circuit 310, a storage medium 320, a socket 330, a processor 340, and memory 350. The electronic device 210 is not limited to the elements illustrated in FIG. 3A, and may be implemented to include more or fewer elements. For example, the electronic device 210 may be implemented to further include the elements of the electronic device 101 described in FIG. 1.

According to various embodiments of the disclosure, the communication circuit 310 may support communication with external devices (e.g., the external electronic device 220 and/or the server 230 of FIG. 2) associated with the electronic device 210. For example, since the communication circuit 310 may be implemented like the communication module 190 described in FIG. 1, redundant description will be skipped. The electronic device 210 may be communication-connected to the external devices (e.g., the external electronic device 220 and/or the server 230 of FIG. 2) by using the communication circuit 310 and receive various types of information stored in the external devices.

According to various embodiments of the disclosure, the storage medium 320 may store various types of information (e.g., at least one of the contact information, SMS information, location information, calendar information, image, or voice information described in FIG. 2). For example, referring to FIG. 3A, the storage medium 320 may include a subscriber identification module (SIM) card (or user subscriber identity modules (USIM) chip) 321 and a storage device 323 of a type different from that of the SIM card 321. The SIM card 321 is an integrated circuit (IC) card including a subscriber identification module and has its own unique number, and the SIM card 321 may be implemented to perform subscriber authentication based on the unique number. In addition, the SIM card 321 may store important information, such as contact information, subscriber information, network information, and authentication information, and information, such as a text message and an email. The storage device 323 may include a storage device, such as an optical disk, flash memory, and a hard disk, such as a solid state-drive (SSD), and may further include, without being limited to the description above, various types of storage devices that can be coupled to and/or separated from the electronic device 210. The electronic device 210 may include a physical structure so that the electronic device 210 can be coupled to and/or separated from the storage medium 320. For example, the electronic device 210 may include the socket 330 (or a slot, a connector, or a tray) into which the storage medium 320 can be inserted. In another example, the electronic device 210 may include a connector for connection to the storage medium 320 by wire. In addition, without being limited to the description, the electronic device 210 may be connected to the storage device 323 wirelessly (e.g., wireless communication connection using the communication circuit 310).

According to various embodiments of the disclosure, the socket 330 may be electrically connected to the storage medium 320. The electronic device 210 may be electrically connected, via the socket 330, to a storage device coupled to the socket 330. For example, the socket 330 includes at least one pin, and the socket 330 and the storage medium 320 may be electrically connected by contacting of the at least one pin with a pin and/or a connector of the storage device, which are inserted into the socket 330 so as to be connected. When the storage device is separated from the socket 330, the at least one pin of the socket 330 and the pin of the storage medium 320 are separated, thereby disconnecting the electrical connection. The electronic device 210 may acquire various types of information from the storage medium 320 via the socket 330, and/or store various types of information in the electronic device 210. An interface (not illustrated) (or a signal line or an electric line) for an electrical connection may be further provided between the socket 330 and the processor 340. The socket 330 may be described with terms, such as a slot, a connector, or a tray, for the electrical connection to the storage medium 320, instead of the term as the socket 330. In addition, without being limited to the description, the socket 330 may be described with various terms at the level of those skilled in the art.

Hereinafter, description will be provided to an example of the processor 340 according to various embodiments. The processor 340 may include at least one of an application processor (AP), a central processing unit (CPU), a graphic processing unit (GPU), a display processing unit (DPU), or a neural processing unit (NPU). The operation of the processor 340 described below may be performed according to execution of modules (e.g., an information acquisition module 351 and an information management module 353) stored in the memory 350. At least some of the modules (e.g., the information acquisition module 351 and the information management module 353) stored in the memory 350 may be implemented (e.g., executed) in software, firmware, or a combination of at least two thereof. For example, the modules may be implemented in the form of an application (e.g., an information recovery application described later), a program, a computer code, instructions, a routine, or a process executable by the processor 340. Accordingly, when the modules (e.g., the information acquisition module 351 and the information management module 353) are executed by the processor 340, the modules (e.g., the information acquisition module 351 and the information management module 353) may cause the processor 340 to perform operations (or functions that the modules are able to provide) associated with the modules. Therefore, hereinafter, a description that a specific module performs an operation may be interpreted as indication that the processor 340 performs the operation in response to execution of the specific module. Alternatively, the modules (e.g., the information acquisition module 351 and the information management module 353) may be implemented as a part of the specific application. Alternatively, without being limited to description or illustration, each of the modules may be implemented as hardware (e.g., the processor 340 or a control circuit) separate from the processor 340. At least some of operations of the processor 340, based on the modules, described below may be implemented by a separate module.

Referring to FIG. 3B, the information acquisition module 351 may acquire information (e.g., contact information) stored in the external devices (e.g., the external electronic device 220 and/or the server 230 of FIG. 2) (or different storage media (or storages) which store information). For example, the information acquisition module 351 may establish a communication connection to the external electronic device 220 by using the communication circuit 310 and receive contact information stored in the external electronic device 220. In another example, the information acquisition module 351 may acquire contact information stored in the external electronic device 220 from the storage device of the external electronic device 220. For example, the storage medium 320 may be separated from the external electronic device 220, and the separated storage medium 320 may be coupled to the electronic device 210. The information acquisition module 351 may acquire contact information stored in the storage device from the coupled storage medium 320. In another example, the information acquisition module 351 may establish a communication connection to the server 230 by using the communication circuit 310 and receive contact information from the server 230. As described above, based on an account of a user of the electronic device 210, the server 230 may transmit contact information associated with the account of the user to the electronic device 210. When the information acquisition module 351 (e.g., a contact information recovery function of the information recovery application) is executed, operations of the processor 340 based on the information acquisition module 351 are sequentially performed, so that the electronic device 210 may sequentially acquire contact information 360 from different storage media (e.g., the external electronic device 220 (e.g., the storage device of the external electronic device 220), the storage device (e.g., the SIM card 321), and the server 230).

According to various embodiments of the disclosure, information acquired by the information acquisition module 351 may include data for each of multiple parameters. The parameters may refer to types of data included in the information, and instead of the term parameters, the parameters may be described with various terms to indicate types of data, such as data types, categories, and groups. For example, referring to Table 1 below, contact information includes, as multiple parameters, parameters 381, 383, 385, and 387 representing at least one of name, phone number, account, email, or group. However, the contact information is not limited to the description, and may include more types of parameters. The name may indicate a name (e.g., a person's name) representing a person corresponding to the contact information, the phone number may indicate a phone number assigned to an electronic device of the person, and the email may indicate an email of the person. In addition, when the server 230 includes multiple servers, the account may indicate an account of a user of the electronic device 210, which is managed by each of the servers in which the contact information has been received. In addition, the group may indicate a category into which the contact information is classified using a contact application by the user of the electronic device 210. For a specific example, referring to Table 1 below, contact information may include data for each of parameters (e.g., name, phone number, account, email, and group).

contact information may include multiple data input fields for receiving data for each of the multiple parameters 381, 383, 385, and 387. As an example, the execution screen may include a data input field for receiving data for "name" corresponding to the parameter 381 indicating "name", and may include data input fields for receiving data for the remaining parameters 383, 385, and 387, as illustrated in reference numeral 301*c* of FIG. 3C. The electronic device 210 may acquire data input to each of the multiple data input fields, as data for each of the multiple parameters 381, 383, 385, and 387 as shown in Table 1, and may store contact information including each piece of the acquired data. In this case, referring to Table 1, some contact information may include identical data for at least some parameters. For example, when the user inputs contact information of a person with an identical name (e.g., "Gil-dong Hong"), the electronic device 210 may store contact information (e.g., first contact information 373*a* and third contact information 373*b*) including identical data for a specific parameter (e.g., name). The contact information including the identical data may be integrated by the information management module 353, which will be described later. Since the description of the contact information may also be applied to other types of information (e.g., at least one of SMS information, location information, calendar information, an image, or voice information), redundant description will be skipped. For example, other types of information (e.g., at least one of SMS information, location information, calendar information, an image, or voice information) may also include data for each of the multiple parameters. According to various embodiments of the disclosure, referring to FIGS. 3B and 3C, the information management module 353 may integrate contact information acquired from different external devices, generate tag information 390 corresponding to the integrated contact information (e.g., temporary contact information 370), and separate the integrated contact information, based on the tag information. For convenience of description, contact information generated as a result of integration of the multiple pieces of contact information may be described as the temporary contact information 370, but is not limited to the description (i.e., may be described as contact information). The integration (or coupling or combining) may be defined as generation of one piece of contact information, based on multiple pieces of contact information (e.g., the first contact information 373*a*, second contact information 371*a*, and the third contact information 373*b*). The separation may be defined as generation of multiple pieces of contact information, based on the one piece of contact information. Hereinafter, description will be provided for an example of integration and separation based on

TABLE 1

| Parameter | Name | Phone number | Account | Email | Group | . . . |
|---|---|---|---|---|---|---|
| First contact information | Gil-dong Hong | 01011111111 | Aserver | A@A.net | Agroup | . . . |
| Second contact information | Sun-sin Lee | 01033333333 | Bserver | B@A.net | Bgroup | . . . |
| Third contact information | Gil-dong Hong | 01022222222 | Aserver | A@A.net | Agroup | . . . |
| . . . | . . . | . . . | . . . | . . . | . . . | . . . |

Data for each of the parameters of the contact information may be acquired by a user input and/or the electronic device 210.

Referring to FIG. 3C, in reference numeral 301*c*, an execution screen of the contact application for inputting tag information by the information management module 353 according to various embodiments. According to various embodiments of the disclosure, the information management module 353 (e.g., a temporary storage module 355) may integrate contact information (e.g., the first contact information 373a and the third contact information 373b), in which at least some data are identical, from among the multiple pieces of contact information (e.g., the first contact information 373a, the second contact information 371a, and the third contact information 373b) acquired from the multiple storage media (e.g., the external electronic device 220, the storage media, and/or the server 230) by the information acquisition module 351, and may generate the tag information 390 for each piece of contact information (e.g., the temporary contact information 370) acquired as a result of integration. For example, an information integration module 353a may identify data for each of the multiple parameters 381, 383, 385, and 387 included in the respective multiple pieces of contact information (e.g., the first contact information 373a, the second contact information 371a, and the third contact information 373b), and may integrate, based on the identification, contact information in which data of at least one specific parameter is identical. The at least one specific parameter is some of the multiple parameters 381, 383, 385, and 387, and may be configured as parameters indicating, for example, name and phone number. However, without being limited to the description, the at least one specific parameter may be all of the parameters rather than some of the parameters.

included in the respective multiple pieces of contact information (e.g., the first contact information 373a, the second contact information 371a, and the third contact information 373b), and may acquire, based on the identification, contact information (temporary contact information) (e.g., the second contact information 371a) in which data of at least one specific parameter is different. As a result, the information integration module 353a may acquire integrated contact information (the integrated temporary contact information 373) by integrating the contact information (e.g., the first contact information 373a and the third contact information 373b) including identical data for each of the parameters among the multiple pieces of contact information, and may acquire contact information (e.g., the second contact information 371a) (the temporary contact information 371) remaining after excluding the integrated contact information (e.g., the first contact information 373a and the third contact information 373b). A tag generation module 353b may generate the tag information 390 (e.g., first tag information 391a and second tag information 391b) for each piece of temporary contact information (e.g., the integrated temporary contact information 373 and temporary contact information 371) acquired based on the operation of the information integration module 353a. For example, referring to

TABLE 2

| Parameter | Name | Phone number | Account | Email | Group | Tag information | . |
|---|---|---|---|---|---|---|---|
| Fourth contact information | Gil-dong Hong | 01011111111 01022222222 | Aserver | A@A.net | Agroup | DUA_1011 | . |
| Second contact information | Sun-sin Lee | 01033333333 | Bserver | B@A.net | Bgroup | DUA_1111 | . |
| . . . | . . . | . . . | . . . | . . . | . . . | . . . | . |

Hereinafter, with reference to Table 2, integration and tag information 390 generation by the information integration module 353a will be described. For example, as described in Table 1 above, the information integration module 353a may identify the first contact information 373a and the third contact information 373b, which have an identical specific parameter (e.g., name) 381, and may generate fourth contact information (e.g., integrated temporary contact information 373 of FIGS. 3B and 3C), based on the first contact information 373a and the third contact information 373b. The integrated temporary contact information 373 (e.g., the fourth contact information) may include a single data for the first contact information 373a and the third contact information 373b for each of first parameters (e.g., name, account, email, and group) having the identical data of the first contact information 373a and the third contact information 373b, but may also include multiple different data for the respective first contact information 373a and third contact information 373b for each of second parameters (e.g., phone number) having different data for the first contact information 373a and the third contact information 373b. For example, referring to reference numeral 302c of FIG. 3C and Table 2, the integrated contact information 373 (e.g., the fourth contact information) may include a single data (e.g., Gil-dong Hong) for the parameter 381 corresponding to name, but may include multiple data for the parameter 383 corresponding to phone number (e.g., 010-1111-1111 and 010-2222-2222). In another example, referring to Table 2, the information integration module 353a may identify data for each of the multiple parameters 381, 383, 385, and 387 reference numeral 302c of FIG. 3C, the tag information 390 (e.g., "X1X2X3_x1x2x3x4") may include a first part (e.g., X1X2X3) 390a indicating information associated with multiple storage media (e.g., the external electronic device 220, the storage device, and/or the server 230) associated with specific contact information (e.g., the integrated temporary contact information 373 and temporary contact information 371) and a second part 390b indicating information (e.g., x1x2x3x4) associated with data for each of parameters of the specific contact information. The generated tag information 390 may be implemented in a form included in each piece of the temporary contact information 370 (e.g., the integrated temporary contact information 373 and/or temporary contact information 371). However, without being limited to the description and/or illustration, the tag information 390 may be stored separately from the temporary contact information 370 (e.g., the integrated temporary contact information 373 and/or temporary contact information 371), but may be stored in a form associated with the temporary contact information 370 (e.g., the integrated temporary contact information 373 and/or temporary contact information 371).

In an embodiment of the disclosure, the first part (e.g., X1X2X3) 390a may indicate information on the storage media in which the temporary contact information 370 (e.g., the integrated temporary contact information 373 and/or temporary contact information 371) generated as a result of integration is received. Referring to Table 3 below, values of the first part (e.g., X1X2X3) 390a of the tag information 390 may be configured to be respective specific values (or data)

(e.g., D, U, and A), and may indicate information on the storage media in which contact information acquired to generate temporary contact information is received. Referring to Table 3 below, if the first part 390a (e.g., "X1X2X3") of the tag information 390 of the temporary contact information is "DUA", the tag information 390 may indicate that each piece of contact information for generation of the temporary contact information is received from the external electronic device 220, the SIM card 321, and the server 230 (e.g., account). When there are multiple servers 230, the respective multiple servers may have different values. For example, a first server may be configured to be "A0", a second server may be configured to be "A1", and a third server may be configured to be "A2".

TABLE 3

| X1X2X3 of tag information | Storage medium for reception |
|---|---|
| If X1 is D | External electronic device |
| If X2 is U | SIM card |
| If X3 is A | Server (account) |

In another embodiment of the disclosure, the second part (e.g., x1x2x3x4) 390b may indicate whether there are multiple data for each parameter. For example, each of "x1", "x2", "x3", and "x4" of the second part corresponds to a specific parameter among the multiple parameters, and may include a value (e.g., 0) indicating multiple data and a value (e.g., 1) indicating a single data (or non-multiple data). For example, "x1" may correspond to the parameter 381 corresponding to name, "x2" may correspond to the parameter 383 corresponding to phone number, and "x3" may correspond to the parameter 387 corresponding to group, and "x4" may correspond to the remaining parameter. For example, if the value of the second part 390b ("x1x2x3x4") of the tag information 390 of the temporary contact information is "1011", the tag information 390 may indicate that there are multiple data for the parameter 383 corresponding to phone number, and that there is a single data for the remaining parameters. The second part 390b (e.g., x1x2x3x4) may indicate whether the multiple parameters of multiple pieces of contact information for generation of the temporary contact information 370 are identical. For example, each of "x1", "x2", "x3", and "x4" of the second part corresponds to a specific parameter among the multiple parameters, and may include a value (e.g., 1) indicative of being identical (or indicating no multiple data) and a value (e.g., 0) indicative of being different (or indicating multiple data). For example, if the value of the second part 390b ("x1x2x3x4") of the tag information 390 of the temporary contact information is "1011", the tag information 390 may indicate that there are different data for the parameter 383 corresponding to phone number among multiple pieces of contact information for generation of the temporary contact information (accordingly, there are multiple data for phone number of the temporary contact information), and that the remaining parameters have identical data (accordingly, there is a single data for the remaining parameters of the temporary contact information). According to various embodiments of the disclosure, the tag information 390 may be implemented to include a value indicating whether the respective multiple parameters of multiple pieces of contact information for generation of the temporary contact information 370 have identical data. For example, the tag information 390 may be implemented as Boolean type information which includes "True" when the respective multiple parameters of multiple pieces of contact information have identical data, and includes "False" when the respective multiple parameters have different data. The Boolean type information may be included in the tag information 390 together with information in the form of "X1X2X3_x1x2x3x4". However, without being limited to the description, the Boolean type information may be included in tag information implemented separately from information in the form of "X1X2X3_x1x2x3x4", or may be included in the tag information 390, instead of information in the form of "X1X2X3_x1x2x3x4". Operations of the information integration module 353a and the tag generation module 353b may be performed at each point in time when contact information is acquired from each of the storage media, or may be performed at a point in time when contact information is acquired from all the storage media.

The temporary contact information and tag information generated by the information integration module 353a and the tag generation module 353b may be temporarily stored in a part of the memory 350.

According to various embodiments of the disclosure, an information separation module 353c may generate the temporary contact information 370 into multiple pieces of contact information, based on the tag information 390 for each piece of the temporary contact information 370 (e.g., the integrated temporary contact information 373 and temporary contact information 371). For example, based on a specific parameter selected by a user, the information separation module 353c may select temporary contact information having tag information associated with the parameter, and may generate multiple pieces of contact information, based on data included in the selected temporary contact information. The generated multiple pieces of contact information may include different data for a parameter selected by the user from among the multiple parameters 381, 383, 385, and 387, and may include identical data for some of the remaining parameters. For example, when the specific parameter 383 indicating phone number is selected by the user, the electronic device 210 (e.g., the information separation module 353c) may identify tag information (e.g., X1X2X3_x1"0"x2x3x4) indicating that there are multiple phone numbers, and may identify contact information (e.g., the fourth contact information (the integrated temporary contact information 373)) having the identified tag information (e.g., X1X2X3_x1"0"x2x3x4). The electronic device 210 (e.g., the information separation module 353c) may generate fifth contact information 393a and sixth contact information 393b, as shown in Table 4 below, based on the identified contact information (e.g., the fourth contact information (the integrated temporary contact information 373)). The separated fifth contact information 393a and sixth contact information 393b may be provided on the execution screen of the contact application, as illustrated in reference numeral 303c of FIG. 3C. The separation will be further described in FIGS. 10A to 10C.

TABLE 4

| Parameter | Name | Phone number | Account | Email | Group | Tag information | ... |
|---|---|---|---|---|---|---|---|
| Fifth contact information | Gil-dong Hong | 01011111111 | Aserver | A@A.net | Agroup | DUA_1011 | ... |
| Sixth contact information | Gil-dong Hong | 01022222222 | Aserver | A@A.net | Agroup | DUA_1011 | ... |
| Second contact information | Sun-sin Lee | 01033333333 | Bserver | B@A.net | Bgroup | DUA_1111 | ... |
| ... | ... | ... | ... | ... | ... | ... | ... |

Hereinafter, an example of operations of the electronic device 210 according to various embodiments will be described.

According to various embodiments of the disclosure, the electronic device 210 may acquire multiple pieces of contact information, and integrate contact information including identical data from among the acquired multiple pieces of contact information. The electronic device 210 may generate, based on a result of the integration, tag information for each piece of the acquired contact information, and then separate and provide multiple pieces of contact information, based on the generated tag information.

FIG. 4 is a flowchart 400 for illustrating an operation of an electronic device according to an embodiment of the disclosure.

Referring to FIG. 4, according to various embodiments of the disclosure, the illustrated operations are not limited to the illustrated sequence and may be performed in various sequences. According to various embodiments of the disclosure, more operations than those illustrated in FIG. 4 or at least one operation fewer than those thereof may be performed. Hereinafter, FIG. 4 will be described with reference to FIGS. 5 to 7.

Figure 5:
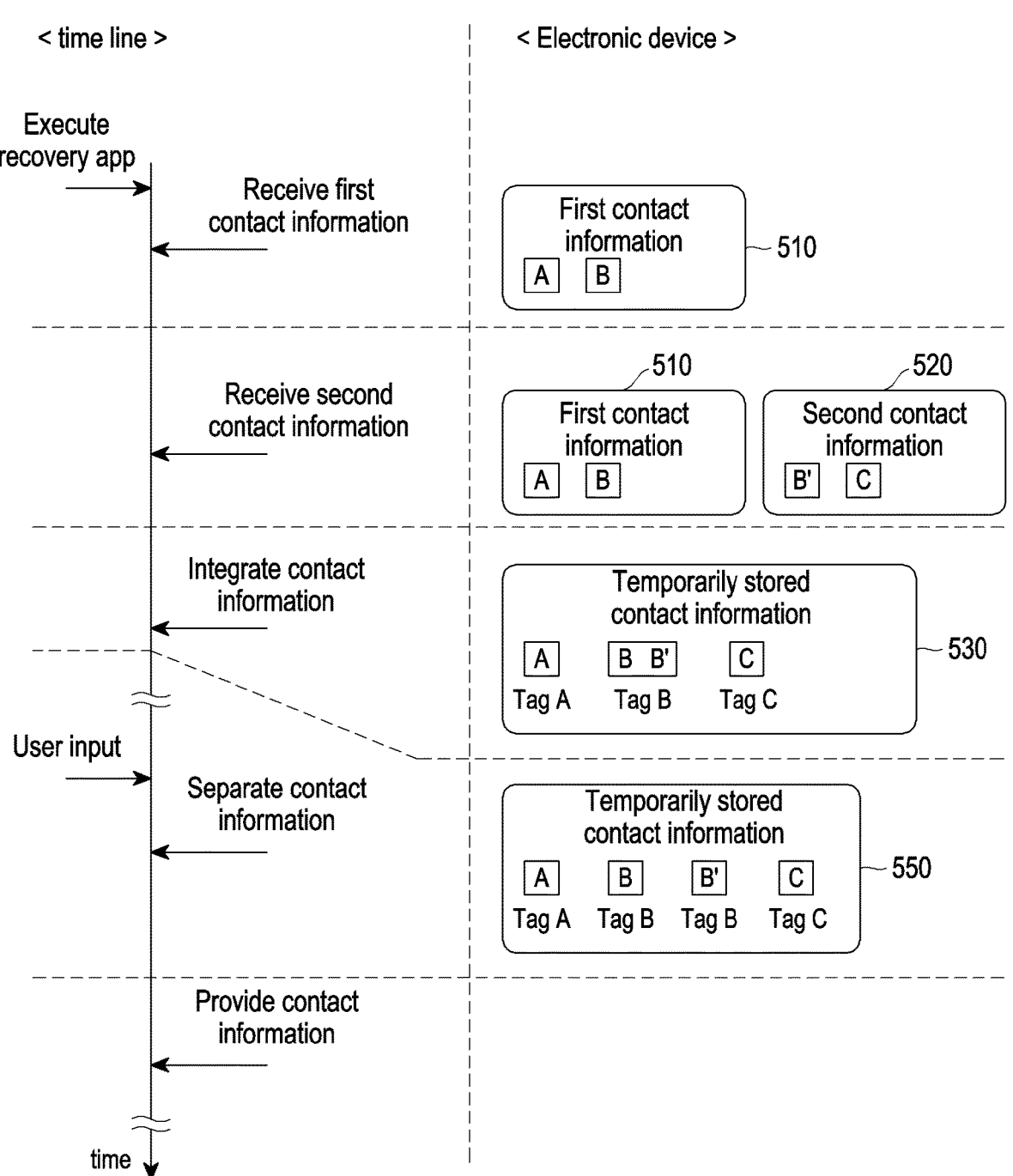
FIG. 5 is a diagram illustrating an operation for acquiring, integrating, and separating contact information of an electronic device, based on a time axis according to an embodiment of the disclosure.

FIG. 5 is a diagram illustrating an operation for acquiring, integrating, and separating contact information of an electronic device, based on a time axis according to an embodiment of the disclosure.

Figure 6:
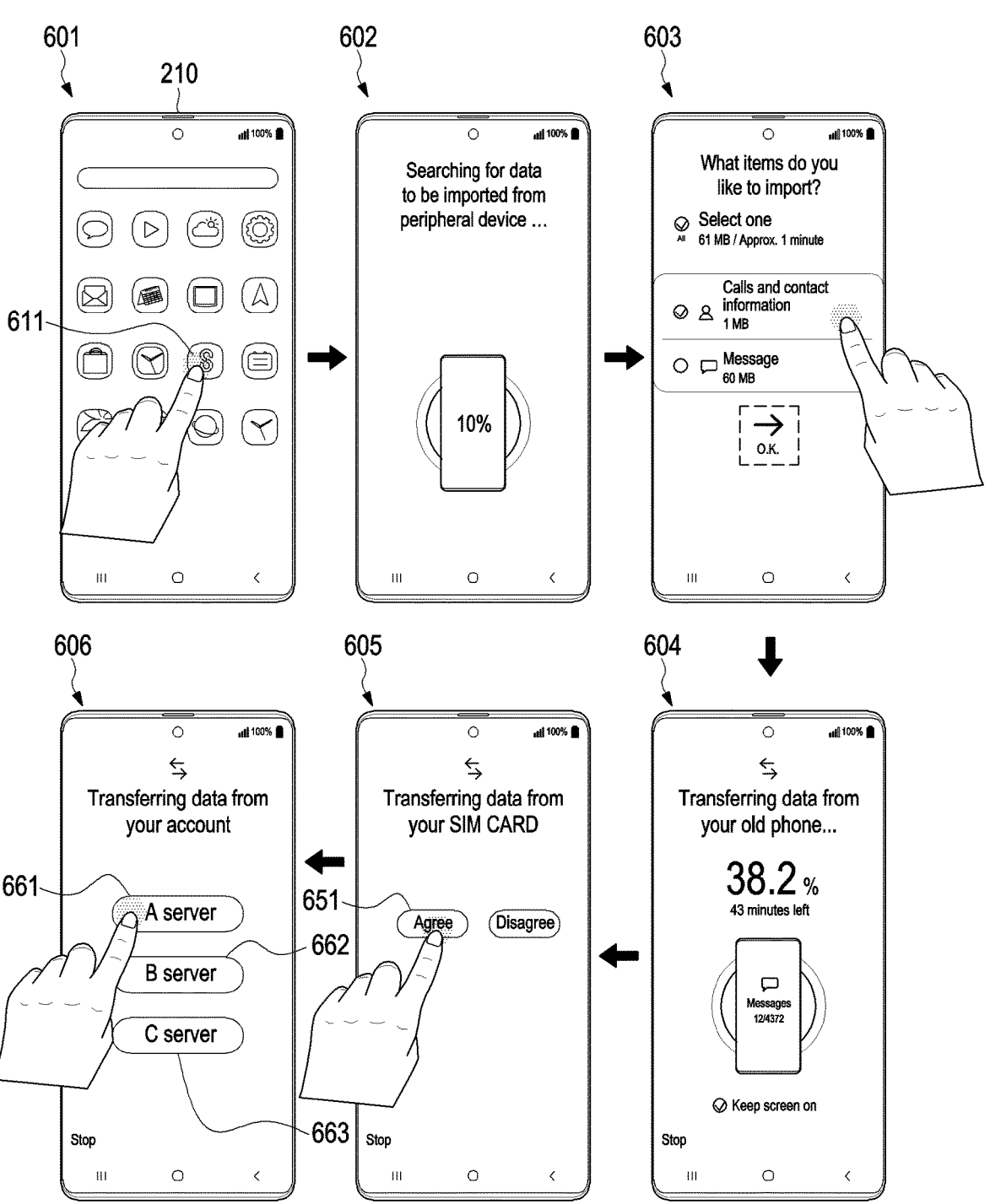
FIG. 6 is a diagram illustrating an operation for acquiring multiple pieces of contact information in response to execution of an information recovery application of an electronic device according to an embodiment of the disclosure.

FIG. 6 is a diagram illustrating an operation for acquiring multiple pieces of contact information in response to execution of an information recovery application of an electronic device according to an embodiment of the disclosure.

Figure 7:
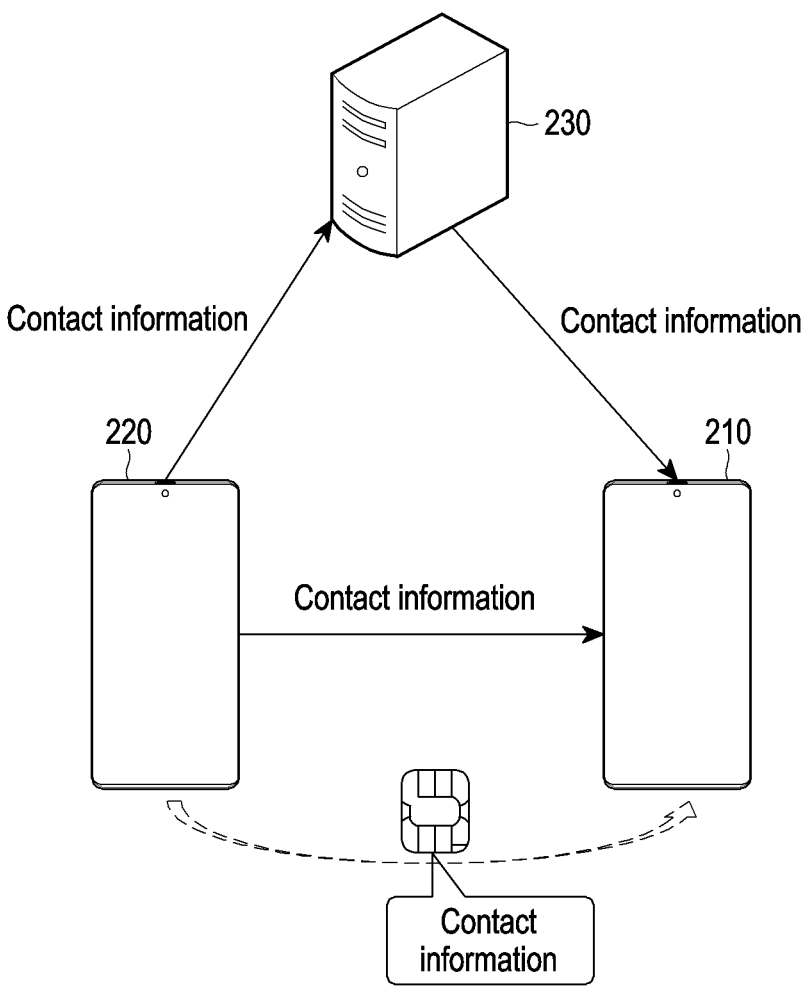
FIG. 7 is a diagram illustrating an operation for acquiring contact information of an electronic device according to an embodiment of the disclosure.

FIG. 7 is a diagram illustrating an operation for acquiring contact information of an electronic device according to an embodiment of the disclosure.

Referring to FIGS. 4, 5, 6, and 7, according to various embodiments of the disclosure, the electronic device 210 may acquire multiple pieces of first contact information in operation 401, and may acquire multiple pieces of second contact information in operation 403. For example, the electronic device 210 may execute an application for information recovery, as shown in FIG. 7. As an example, a user may purchase a new electronic device 210 (e.g., the electronic device 210 of FIG. 7) instead of the previously used electronic device 210 (e.g., the external electronic device 220 of FIG. 7), and may execute the application for information recovery installed on the newly purchased electronic device 210. However, without being limited to the description, the electronic device may execute the application for information recovery to receive contact information from multiple storage media (e.g., the external electronic device 220, the SIM card 321, and/or the server 230) at various times (e.g., aperiodically and/or periodically) rather than at a specific time (e.g., a time for information recovery due to purchase of a new electronic device). For example, as illustrated in 601 of FIG. 6, the electronic device 210 may execute the information recovery application, based on a user's selection of an icon 611 for execution of the application for information recovery. Unless otherwise specified, the execution screens illustrated in reference numerals 602 to 606 of FIG. 6 may be an execution screen of the executed information recovery application. Based on the execution of the information recovery application, the electronic device 210 may sequentially acquire contact information stored in the multiple storage media (e.g., the external electronic device 220, the storage medium 320 (e.g., the SIM card 321), and/or the server 230). For example, as illustrated in reference numerals 602 to 604 of FIG. 6, the electronic device 210 may acquire (or receive) contact information (e.g., first contact information 510 of FIG. 5) from the external electronic device 220. Referring to reference numeral 602 of FIG. 6, the electronic device 210 may identify the external electronic device 220 (e.g., the external electronic device 220 of FIG. 7) placed in the vicinity, by using a communication circuit (e.g., the communication circuit 310 supporting short-distance communication). In this case, although not illustrated, the external electronic device 220 may be running an information recovery application that is the same as the information recovery application above. The electronic device 210 may identify the multiple external electronic devices 220 around the electronic device 210, and may receive information indicating that the information recovery application is running, from the specific external electronic device 220 among the multiple external electronic devices 220. Based on receiving of the information, the electronic device 210 may identify, as a device for information transmission, the external electronic device 220 among the multiple external electronic devices 220, and may establish a communication connection to the identified device. Referring to reference numeral 603 of FIG. 6, based on identifying of the external electronic device 220 (e.g., the external electronic device 220 of FIG. 7), the electronic device 210 may provide a screen for selecting a type of information to be received from the external electronic device 220. The electronic device 210 may request transmission of a type of information (e.g., contact information) selected by the user and receive the selected type of information from the external electronic device 220, via the communication circuit 310. In this case, the electronic device 210 may display a screen indicating that the information is being transmitted, as illustrated in reference numeral 604 of FIG. 6. In another example, after completion of receiving the information from the storage medium (e.g., the external electronic device 220), the electronic device 210 may acquire a selected type of information (e.g., second contact information 520 of FIG. 5) from other storage media (e.g., the storage device or the server 230). Based on identifying that reception of the information from the storage medium (e.g., the external electronic device 220) has been completed, the electronic device 210 may continuously and automatically acquire contact information from the other storage media (e.g., the storage device or the server 230). In this case, the electronic device 210 may display a screen asking whether to acquire the selected type of information from the other storage media, and when acquisition of the information from other storage media is selected by the user, (e.g., when an object 651 in reference numeral 605 of FIG. 6 is selected) the electronic device 210 may acquire contact information from the storage media (e.g., the storage device or the server 230). For example, referring to reference numeral 605 of FIGS. 6 and 7, when reception of contact information from the external electronic device 220 is completed, the electronic device 210 may continue acquiring contact information stored in the storage medium 320 (e.g., the SIM card 321). The storage medium 320 (e.g., the SIM card 321) is separated from the external electronic device 220 and coupled to the electronic device 210, and may be a storage device in which information of the external electronic device 220 has been stored. In addition, referring to reference numeral 606 of FIGS. 6 and 7, when acquisition of the contact information from the storage medium 320 (e.g., the SIM card 321) is completed, the electronic device 210 may continue receiving contact information from the server 230. As described above, the server 230 may transmit, based on an account, contact information associated with the account to the electronic device 210. In this case, when there are multiple servers 230, the electronic device 210 may display objects 661, 662, and 663 for selecting of the multiple servers from which contact information is to be received, as shown at 606 of FIG. 6.

Without being limited to the description and/or illustration, the electronic device 210 may acquire multiple pieces of contact information, based on execution of different applications, rather than the aforementioned information recovery application, for each of the multiple storage media (e.g., the external electronic device 220, the SIM card 321, and the server 230).

Without being limited to the description and/or illustration, the electronic device 210 may acquire multiple pieces of contact information from the respective multiple storage media (e.g., the external electronic device 220, the SIM card 321, and the server 230) in a different sequence.

According to various embodiments of the disclosure, in operation 405, by integrating some contact information including redundant (or identical) data among multiple pieces of first contact information and multiple pieces of second contact information, the electronic device 210 may acquire multiple pieces of contact information and multiple pieces of tag information. For example, as described above, the electronic device 210 (e.g., the information integration module 353a and the tag generation module 353b) may receive multiple pieces of contact information (e.g., the first contact information 510 (e.g., A, B) and the second contact information 520 (e.g., B', C)) from different storage media (e.g., the external electronic device 220, the storage device, and the server 230). The electronic device 210 may identify data of multiple parameters (e.g., parameters indicating name, phone number, account, email, and group) included for each of the multiple pieces of contact information (e.g., the first contact information 510 (e.g., A, B) and the second contact information 520 (e.g., B', C)). Since data for each of the parameters 381, 383, 385, and 387 of contact information has been described above with reference to FIG. 3C, redundant description will be skipped. The electronic device 210 (e.g., the information integration module 353a) may generate, from among the multiple pieces of contact information (e.g., the first contact information 510 (e.g., A, B) and the second contact information 520 (e.g., B', C)), integrated contact information (BB') by integrating contact information (e.g., B and B') having identical data for a specific parameter among the multiple parameters, and may acquire contact information (e.g., A, C) having different data for the specific parameter. Contact information (e.g., A, BB', C) acquired based on a result of the integration may be temporarily stored in the memory 350, and as described above, the contact information (e.g., A, BB', C) may be defined as temporary contact information 530. Since integrating of the contact information of the electronic device 210 may be performed in the same manner as that of the information integration module 353a described above, redundant description will be skipped. In this case, the electronic device 210 (e.g., the tag generation module 353b) may generate tag information (e.g., Tag A, Tag B, and Tag C) for each piece of temporary contact information. The tag information may be included in each piece of temporary contact information, or may be separately stored in a form associated with the contact information. As described above with reference to FIG. 3C, the tag information the tag information (e.g., Tag A, Tag B, and Tag C) may indicate whether each of the parameters has multiple data, and redundant description will be skipped.

According to various embodiments of the disclosure, the electronic device 210 may determine, in operation 407, whether contact information is acquired from another storage medium, and if it is determined that contact information is acquired from the another storage medium, the electronic device 210 may perform operation 405 again to continue integrating contact information and generating tag information. In an embodiment of the disclosure, the electronic device 210 may determine, at a point in time when reception of contact information (e.g., the second contact information 520) from the storage medium (e.g., the SIM card 321) is completed, whether to continue receiving contact information from a storage medium (e.g., the server 230). In another embodiment of the disclosure, the electronic device 210 may determine, within a designated time from a point in time when reception of the contact information (e.g., the second contact information 520) from the storage medium (e.g., the SIM card 321) is completed, whether to continue receiving contact information from a storage medium (e.g., the server 230). Without being limited to the description and/or illustration, the electronic device 210 may determine whether to acquire contact information from the storage medium (e.g., the external electronic device 220 or the SIM card 321) from which contacts are previously acquired, rather than from the server 230.

According to various embodiments of the disclosure, if it is determined that contact information is not acquired from the another storage medium, the electronic device 210 may determine, in operation 409, whether a designated condition is satisfied. Satisfying of the designated condition may trigger an event to separate the temporarily stored contact information (e.g., A, BB', C). For example, the satisfying of the designated condition may include at least one of receiving a user's input (e.g., a user's input that triggers management (or separation, classification, or batch) of the contact information), the current time being included in a designated time slot, a designated time being elapsed from a first time point at which the contact information is recovered (e.g., a point in time when the first contact information 510 is received), or tag information being configured for a preconfigured number or more pieces of contact information among the multiple pieces of contact information stored in the electronic device 210.

According to various embodiments of the disclosure, if it is determined that the designated condition is satisfied, an electronic device 411 may provide, in operation 411, multiple pieces of third contact information (e.g., temporary contact information 550), which include different data for a specific parameter selected by the user, based on at least some of the multiple pieces of tag information and at least some of the multiple pieces of contact information. For example, the electronic device 210 may receive the user's input for management (or separation or classification) of the contact information, based on a specific parameter (e.g., phone number). The user's input will be described with reference to FIG. 9A. The electronic device 210 (e.g., the information separation module 353c) may identify at least one piece of tag information indicating that the specific parameter (e.g., phone number) among the multiple pieces of tag information has multiple data, and may separate contact information (e.g., BB') having the identified at least one piece of tag information into multiple pieces of contact information (e.g., B, B'). Since separating of the contact information of the electronic device 210 may be performed in the same manner as that of the information separation module 353c described above, redundant description will be skipped. In this case, each of the multiple pieces of separated contact information (e.g., B, B') may include tag information (Tag B), but may not include tag information, without being limited to the description. As will be described later, each of the multiple pieces of contact information (e.g., B, B') may be assigned with a tag identifier (e.g., TAG ID), and the electronic device 210 may provide multiple pieces of contact information having the tag identifier. The tag identifier (e.g., TAG ID) may indicate completion of contact information separation, after contact information integration. Accordingly, the electronic device 210 may identify only contact information having some tag identifiers without a need to process all contact information, so that an operational burden for processing contact information of the electronic device 210 can be reduced, and efficiency of providing contact information of the electronic device 210 can be improved.

Hereinafter, an example of operations of the electronic device 210 according to various embodiments will be described. Since at least some of the aforementioned operations (e.g., the operations of the flowchart of FIG. 4) of the electronic device 210 and the operations to be described below may be performed in combination, redundant description will be skipped.

According to various embodiments of the disclosure, based on multiple pieces of tag information, the electronic device 210 may provide multiple pieces of contact information, based on a user-desired parameter for classification.

Figure 8:
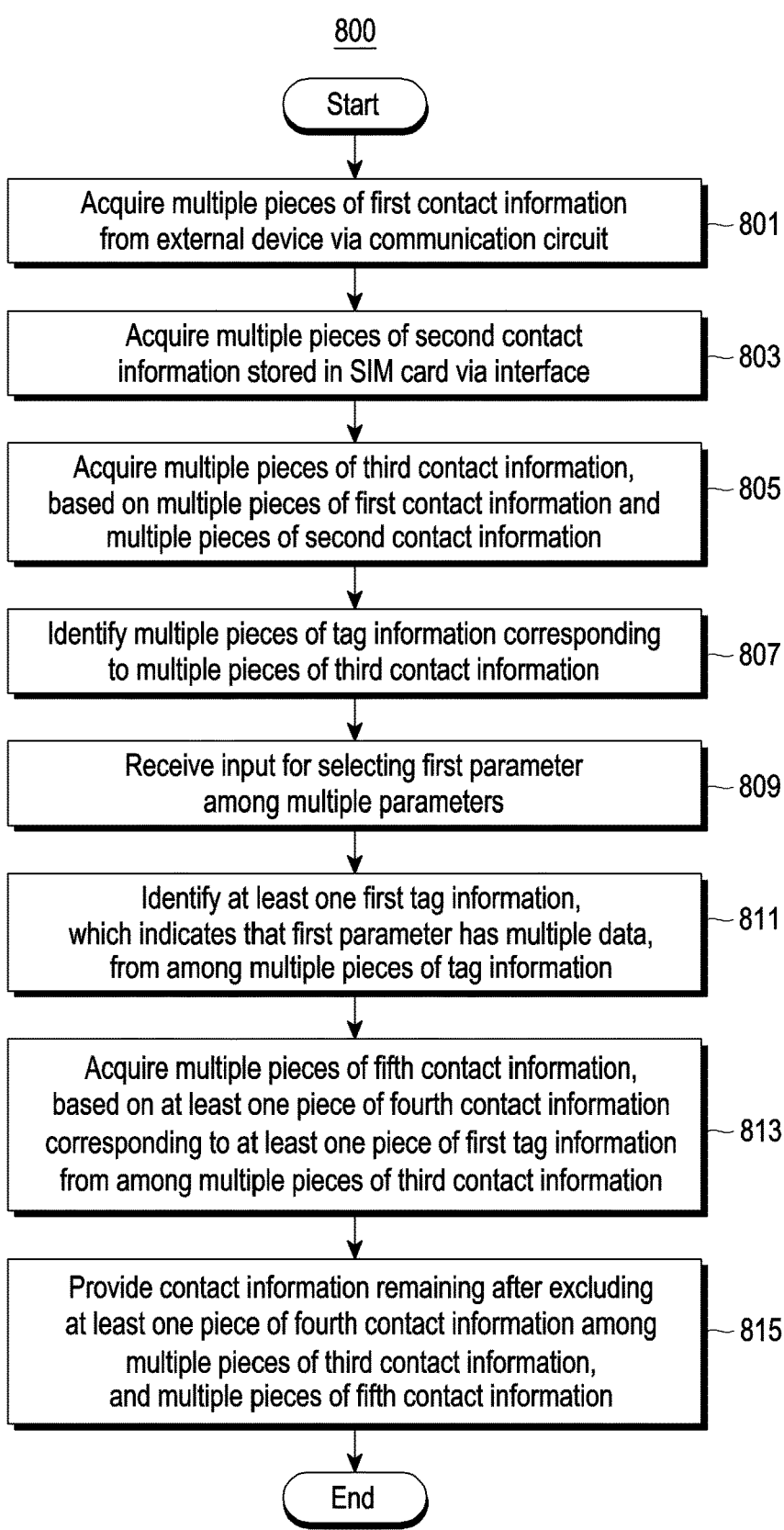
FIG. 8 is a flowchart for illustrating an operation of an electronic device according to an embodiment of the disclosure.

FIG. 8 is a flowchart 800 for illustrating an operation of an electronic device according to an embodiment of the disclosure.

Referring to FIG. 8, according to various embodiments of the disclosure, the illustrated operations are not limited to the illustrated sequence and may be performed in various sequences. According to various embodiments of the disclosure, more operations than those illustrated in FIG. 8 or at least one operation fewer than those thereof may be performed. Hereinafter, FIG. 8 will be described with reference to FIGS. 9A, 9B, and 10A to 10C.

Figure 9A:
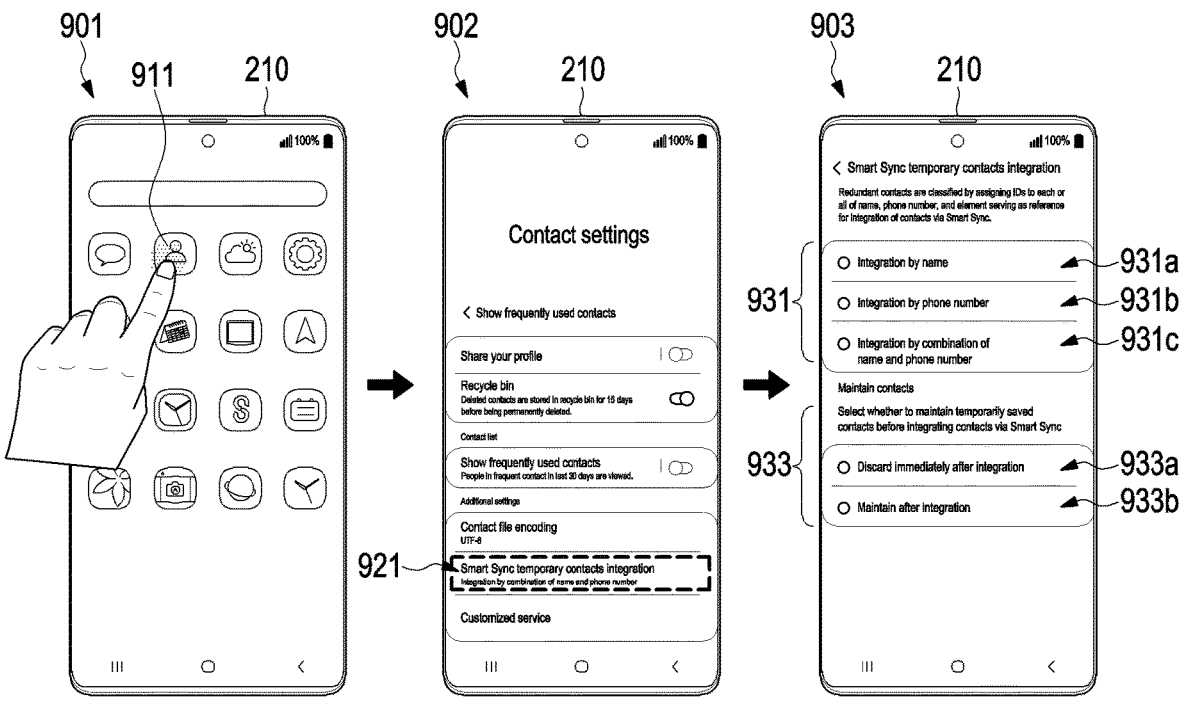
FIG. 9A is a diagram illustrating an operation for receiving a user's input for selecting a parameter for classification of contact information of an electronic device according to an embodiment of the disclosure.

FIG. 9A is a diagram illustrating an operation for receiving a user's input for selecting a parameter for classification of contact information of an electronic device according to an embodiment of the disclosure.

Figure 9B:
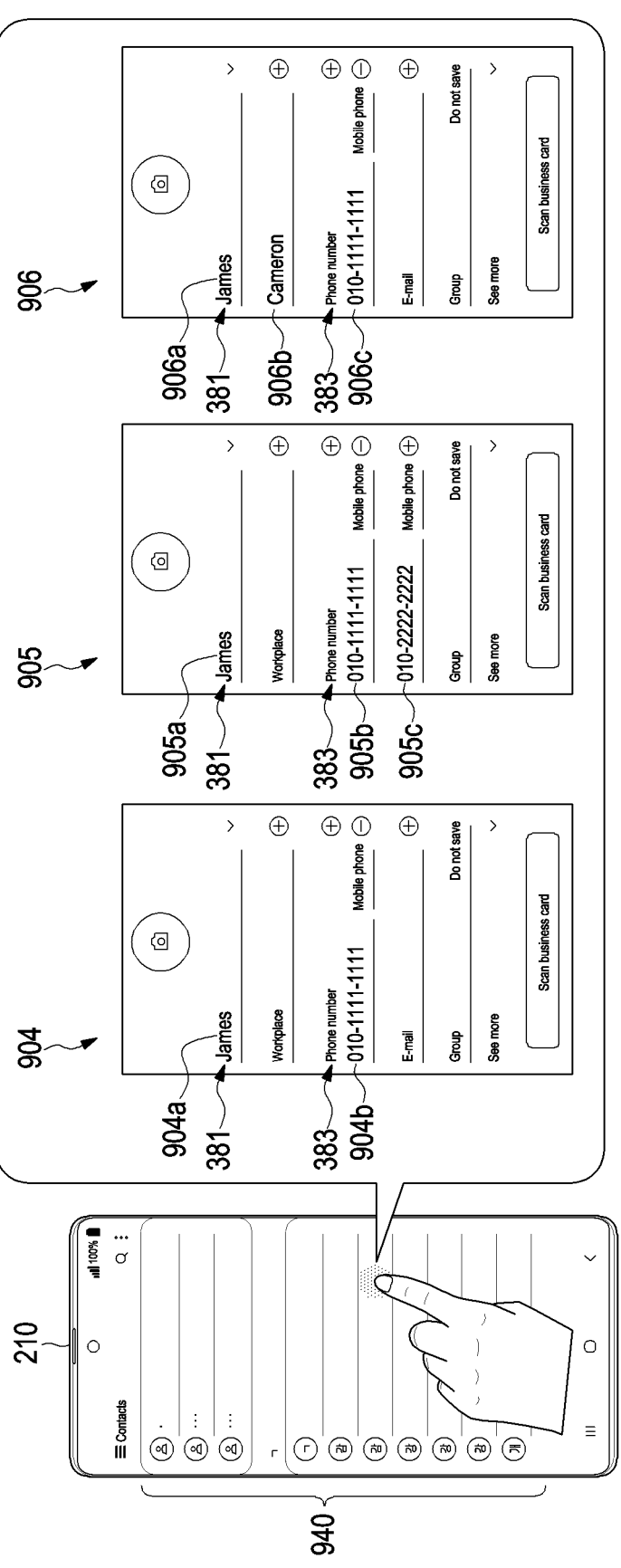
FIG. 9B is a diagram illustrating contact information classified for each parameter selected by a user of an electronic device according to an embodiment of the disclosure.

FIG. 9B is a diagram illustrating contact information classified for each parameter selected by a user of an electronic device, according to an embodiment of the disclosure.

Figure 10A:
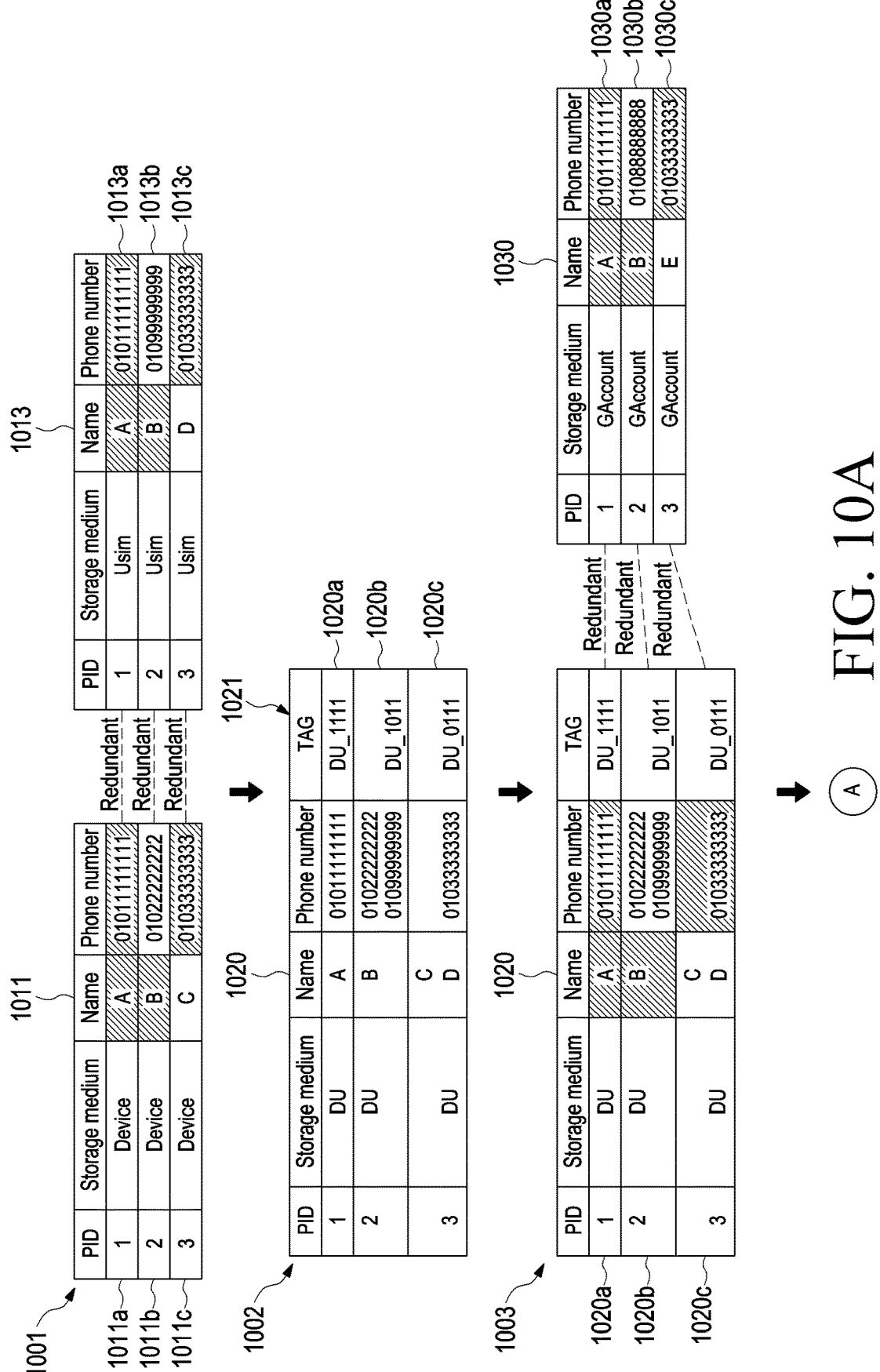
FIG. 10A is a diagram illustrating an operation for integrating multiple pieces of contact information of an electronic device according to an embodiment of the disclosure.

FIG. 10A is a diagram illustrating an operation for integrating multiple pieces of contact information of an electronic device according to an embodiment of the disclosure.

Figure 10B:
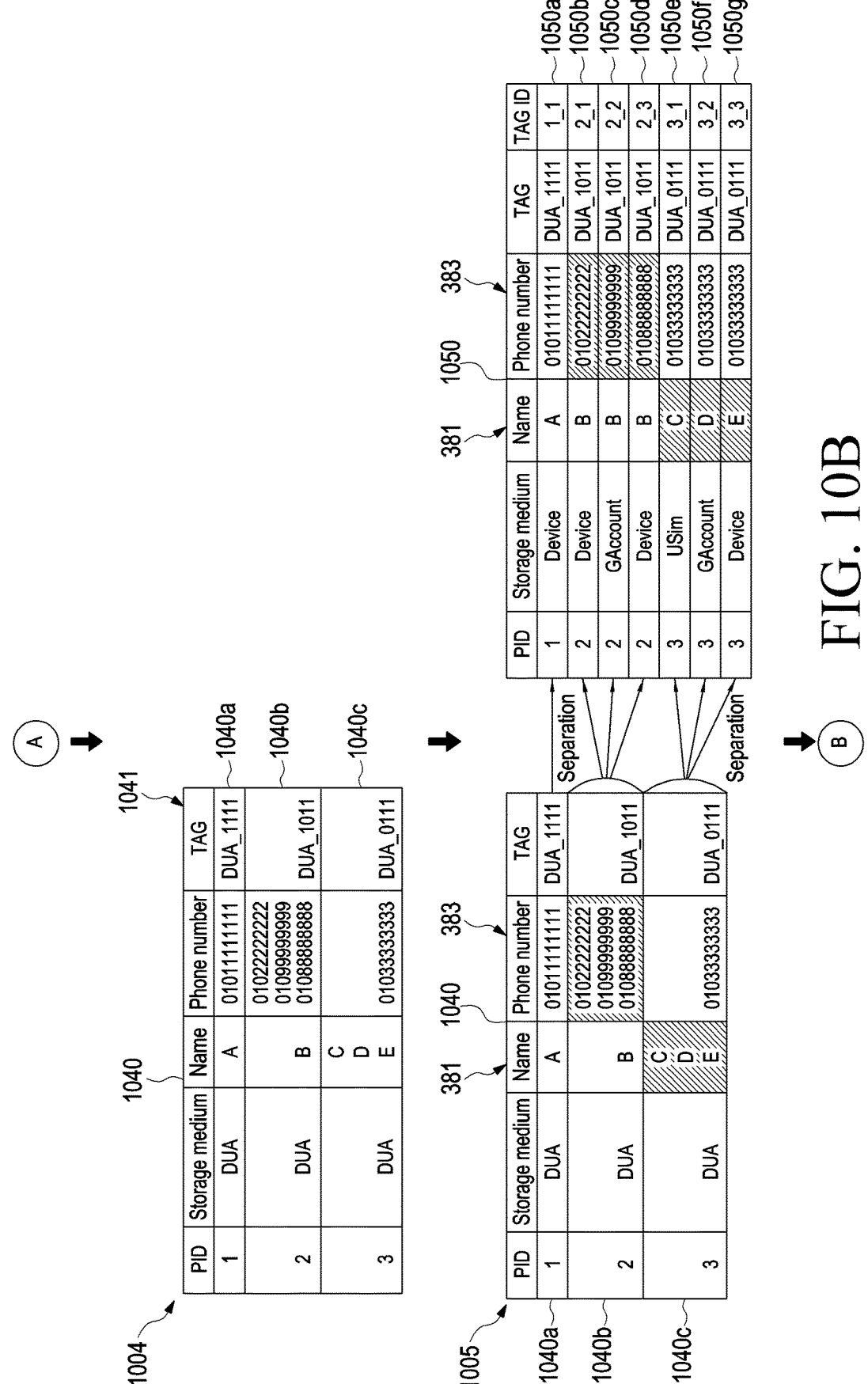
FIG. 10B is a diagram illustrating an operation for integrating multiple pieces of contact information, based on tag information of an electronic device according to an embodiment of the disclosure.

FIG. 10B is a diagram illustrating an operation for integrating multiple pieces of contact information, based on tag information of an electronic device according to an embodiment of the disclosure.

Figure 10C:
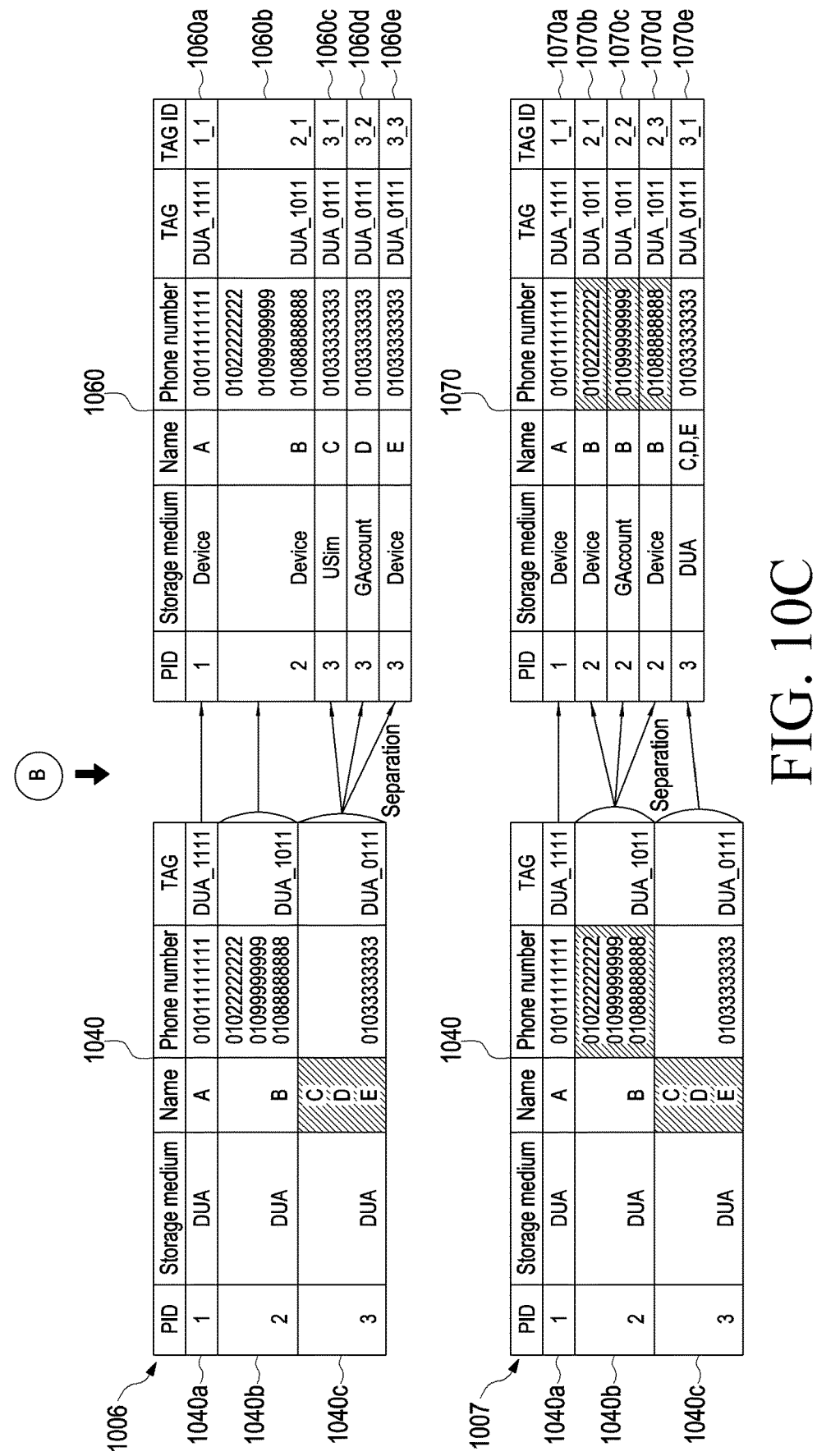
FIG. 10C is a diagram illustrating an operation for integrating multiple pieces of contact information, based on tag information of an electronic device according to an embodiment of the disclosure.

FIG. 10C is a diagram illustrating an operation for integrating multiple pieces of contact information, based on tag information of an electronic device according to an embodiment of the disclosure. PID in FIGS. 10A to 10C may indicate an identifier for each piece of contact information.

Referring to FIGS. 8, 9A, 9B, 10A, and 10B, according to various embodiments of the disclosure, the electronic device 210 may acquire, in operation 801, multiple pieces of first contact information 510 from an external device via the communication circuit 310, and may acquire, in operation 803, multiple pieces of second contact information 520 stored in the SIM card 321 via an interface. For example, as illustrated in reference numeral 1001 of FIG. 10A, the electronic device 210 may acquire contact information (e.g., multiple pieces of first contact information 1001 and multiple pieces of second contact information 1013) from different storage media (e.g., two storage media among the external electronic device 220, the storage device, and/or the server 230). Since operation 801 and operation 803 of the electronic device 210 may be performed in the same manner as aforementioned operation 401 and operation 403 of the electronic device 210, redundant description will be skipped.

According to various embodiments of the disclosure, the electronic device 210 may acquire multiple pieces of third contact information in operation 805, based on the multiple pieces of first contact information 510 and the multiple pieces of second contact information 520, and may identify multiple pieces of tag information corresponding to the multiple pieces of third contact information in operation 807. For example, the electronic device 210 may identify contact information (e.g., 1011a and 1013a, 1011b and 1013b, and 1011c and 1013c) having identical (redundant) data for a specific parameter (e.g., name or phone number) among the multiple pieces of first contact information 1001 and the multiple pieces of second contact information 1013, and may integrate the identified contact information (e.g., 1011a and 1013a, 1011b and 1013b, and 1011c and 1013c). For example, as at least a part of integrating the contact information (e.g., 1011a and 1013a, 1011b and 1013b, and 1011c and 1013c), the electronic device 210 (e.g., the information integration module 353a) may generate contact information, based on the contact information identified to include identical data, and may generate tag information 1021 corresponding to the generated contact information 1020. The temporary contact information 1020 generated based on a result of the integration may include multiple data for the specific parameter, and may include a single data for the remaining parameters (e.g., parameters identified to have identical data). For example, referring to reference numeral 1002 in FIG. 10A, the electronic device 210 may integrate (or generate), into a single piece of temporary contact information 1020a, contact information (e.g., 1011a and 1013*a*) having identical data for all parameters of the identified contact information, and may generate first tag information (DU_1111) corresponding to the contact information. The contact information 1020*a* may include single data for each of the multiple parameters. The first tag information (DU_1111) may include a value (e.g., "1111") indicating that there are not multiple data for each of parameters. In another example, referring to reference numeral 1002 in FIG. 10A, the electronic device 210 may generate, based on the contact information 1011*b* and 1013*b*, and 1011*c* and 1013*c* having identical data for the specific parameter (e.g., phone number or name), temporary contact information 1020*b* and 1020*c* including different data for the specific parameter (e.g., phone number or name) of the contact information 1011*b* and 1013*b*, and 1011*c* and 1013*c* and identical data for the remaining parameters, and may generate second tag information (DU_1011, DU_0111) corresponding to the temporary contact information 1020*b* and 1020*c*. The second tag information (DU_1011, DU_0111) may include a value (e.g., "1011", "0111") indicating that there are multiple data for the specific parameter (e.g., phone number or name).

According to various embodiments of the disclosure, referring to reference numeral 1003 of FIG. 10A and reference numeral 1004 of FIG. 10B, after the electronic device 210 integrates the multiple pieces of contact information (e.g., the multiple pieces of first contact information 1011 and the multiple pieces of second contact information 1013) acquired from the two storage media (e.g., the external electronic device 220 and the storage device (e.g., the SIM card 321)), if contact information 1030 is continuously received from a new storage medium (e.g., the server 230), the electronic device 210 may integrate the generated temporary contact information 1020 and the newly received contact information 1030. For example, the electronic device 210 may integrate (or generate), into a single piece of temporary contact information 1040*a*, contact information (e.g., 1020*a* and 1030*a*) having identical data for all parameters of the identified contact information, and may generate first tag information (DUA_1111) corresponding to the contact information. In another example, the electronic device 210 may generate, based on the contact information 1020*b* and 1030*b*, and 1020*c* and 1030*c* having identical data for the specific parameter (e.g., phone number or name), temporary contact information 1040*b* and 1040*c* including different data for the specific parameter (e.g., phone number or name) of the contact information 1020*b* and 1030*b*, and 1020*c* and 1030*c* and identical data for the remaining parameters, and may generate second tag information (DUA_1011, DUA_0111) corresponding to the temporary contact information 1040*b* and 1040*c*. Based on the integration of the electronic device 210, as a result, the temporary contact information 1040 and tag information 1041 may be generated as illustrated in reference numeral 1004 of FIG. 10B. Since the integration of the contact information (e.g., the temporary contact information 1020 and the newly received contact information 1030) of the electronic device 210 may be performed as described above, redundant description will be skipped.

The electronic device 210 is not limited to the description and/or illustration, and when contact information is received from all the storage media, the electronic device 210 may generate temporary contact information as illustrated in reference numeral 1004 of FIG. 10B, by integrating all the received contact information.

According to various embodiments of the disclosure, in operation 809, the electronic device 210 may receive an input for selecting a first parameter from among the multiple parameters. For example, the electronic device 210 may receive, based on an application (e.g., a contact application) which manages contact information, a user's input for selecting a parameter serving as a reference for classifying the contact information (e.g., temporary contact information). As illustrated in reference numeral 901 of FIG. 9A, the electronic device 210 may receive a user's input for selecting an icon 911 for executing a contact application, and execute the contact application. When a setting menu of the executed contact application is selected, the electronic device 210 may display an execution screen of the contact application, which includes multiple menus, as illustrated in reference numeral 902 of FIG. 9A. The multiple menus may include a specific menu 921 for selecting a parameter serving as a reference for classifying temporary contacts. The classification may be an operation of processing multiple pieces of contact information so that the multiple pieces of contact information include different data (or include unique (or single) data) for a specific parameter. When the specific menu 921 is selected, the electronic device 210 may display, as illustrated in reference numeral 903 of FIG. 9A, a screen including first objects 931 for selecting parameters to be references for classification and second objects 933 for selecting whether to delete or maintain temporary contact information after the temporary contact information is classified based on the parameters. For example, referring to reference numeral 903 of FIG. 9A, the first objects 931 may be implemented to include an object 931*a* for selecting a first parameter indicating name, an object 931*b* for selecting a second parameter indicating phone number, and an object 931*c* for selecting the first parameter and the second parameter, but may be implemented to include objects for selecting more diverse types of parameters (e.g., at least one of account, email, or group), without being limited to the description and/or illustration. In another example, referring to reference numeral 903 of FIG. 9A, the second objects 933 may include an object 933*a* and an object 933*b* for deleting and maintaining temporary contact information (e.g., the temporary contact information 1040 of FIGS. 10B and 10C) after classification, respectively. As will be described later with reference to FIGS. 14, 15A, and 15B, when the object 933*b* for maintaining is selected, the temporary contact information may be stored in memory even after contact information separation of the electronic device 210, and a service based on the stored temporary contact information may be provided.

According to various embodiments of the disclosure, the electronic device 210 may identify, in operation 811, at least one piece of first tag information indicating that the first parameter has multiple data from among the multiple pieces of tag information, and may acquire, in operation 813, multiple pieces of fifth contact information, based on at least one piece of fourth contact information corresponding to the at least one piece of first tag information from among the multiple pieces of third contact information. As described above, the electronic device 210 may receive a selection of at least some parameters (e.g., name, phone number, and name and phone number) to be references for classification from among the multiple parameters, and may identify tag information indicating that the selected at least some parameters have multiple data. The electronic device 210 may generate, as multiple pieces of contact information, contact information associated with the identified tag information from among the multiple pieces of temporary contact information, may acquire the remaining temporary contact information from among the multiple pieces of temporary contact information, and may generate, as a result, tag identifiers (Tag IDs) corresponding to the generated and/or acquired contact information.

In an embodiment of the disclosure, referring to reference numeral 1005 of FIG. 10B, when name and phone number are selected as parameters to be references for classification, the electronic device 210 may identify, among the multiple pieces of temporary contact information 1040*a*, 1040*b*, and 1040*c*, the temporary contact information 1040*b* having tag information (e.g., "x1 0 x3 x4") indicating that phone number has multiple data and the temporary contact information 1040*c* having tag information (e.g., "0 x2 x3 x4") indicating that name has multiple data. The electronic device 210 may identify different data for phone number (e.g., "0102222222", "01099999999" and "01088888888") included in the temporary contact information 1040*b* corresponding to tag information (e.g., DUA_1011) indicating that there are multiple data for phone number, may include each of the different data for phone number (e.g., "0102222222", "01099999999" and "01088888888"), and may generate each piece of temporary contact information 1050*b*, 1050*c*, and 1050*d* including identical data for the remaining parameters (e.g., name and tag information). In addition, the electronic device 210 may identify different data for name (e.g., "C", "D", and "E") included in the temporary contact information 1040*c* corresponding to tag information (e.g., DUA_0111) indicating that there are multiple data for name, may include each of the different data for name (e.g., "C", "D", and "E"), and may generate each piece of temporary contact information 1050*e*, 1050*f*, and 1050*g* including identical data for the remaining parameters (e.g., phone number and tag information). The electronic device 210 may acquire the temporary contact information 1050*a* corresponding to the contact information (e.g., the temporary contact information 1040*a*) (or contact information including a single data corresponding to the selected parameter (e.g., name and phone number)) remaining after excluding the identified temporary contact information from among the multiple pieces of temporary contact information 1040. The temporary contact information 1050*a* to 1050*g* acquired according to separation may be defined as final temporary contact information 1050, for convenience of description. The electronic device 210 may finally generate tag identifiers (TAG IDs) corresponding to the generated temporary contact information and the acquired remaining contact information. The tag identifier (TAG ID) may indicate that classification of the temporary contact information 1040 has been completed. The tag identifier (TAG ID) may be included in the final temporary contact information 1050, or may be separately stored in a form associated with the final temporary contact information 1050.

In an embodiment of the disclosure, referring to reference numeral 1006 of FIG. 10C, when name is selected as a parameter to be a reference for classification, the electronic device 210 may identify the temporary contact information 1040*c* having tag information (e.g., "0 x2 x3 x4") indicating multiple data of name from among the multiple pieces of temporary contact information. The electronic device 210 may identify different data for name (e.g., "C", "D", and "E") included in the temporary contact information 1040*c* corresponding to tag information (e.g., DUA_"0"111) indicating that there are multiple data for name, may include each of the different data for name (e.g., "C", "D", and "E"), and may generate each piece of temporary contact information 1060*c*, 1060*d*, and 1060*e* including identical data for the remaining parameters (e.g., phone number and tag information). The electronic device 210 may acquire temporary contact information 1060*a* and 1060*b* corresponding to the contact information 1040*a* and 1040*b* (or contact information including a single data corresponding to the selected parameter (e.g., name)) remaining after excluding the identified temporary contact information 1040*c* from among the multiple pieces of temporary contact information. Finally, tag identifiers (TAG IDs) corresponding to the generated final temporary contact information 1060 and the acquired remaining contact information may be generated.

In an embodiment of the disclosure, referring to reference numeral 1007 of FIG. 10C, when phone number is selected as a parameter to be a reference for classification, the electronic device 210 may identify the temporary contact information 1040*b* having tag information (e.g., "x1 0 x3 x4") indicating multiple data of name from among the multiple pieces of temporary contact information. The electronic device 210 may identify different data for phone number (e.g., "0102222222", "01099999999" and "01088888888") included in the temporary contact information 1040*b* corresponding to tag information (e.g., DUA_1"0"11) indicating that there are multiple data for name, may include the different data for phone number (e.g., "0102222222", "01099999999" and "01088888888"), and may generate temporary contact information 1070*b*, 1070*c*, and 1070*d* including identical data for the remaining parameters (e.g., name and tag information). The electronic device 210 may acquire temporary contact information 1070*a* and 1070*e* corresponding to the contact information 1040*a* and 1040*c* (or contact information including a single data corresponding to the selected parameter (e.g., phone number)) remaining after excluding the identified temporary contact information 1040*b* from among the multiple pieces of temporary contact information. Finally, tag identifiers (TAG IDs) corresponding to the generated final temporary contact information 1070 and the acquired remaining contact information may be generated.

According to various embodiments of the disclosure, the electronic device 210 may separate the multiple pieces of temporary contact information 1040 and generate tag identifiers, based on satisfaction of a designated condition. For example, as described above, the satisfying of the designated condition may include at least one of receiving a user's input (e.g., a user's input that triggers management (or separation or classification) of the contact information), the current time being included in a designated time slot (e.g., dawn), a designated time being elapsed from a first time point at which the contact information is recovered (e.g., a point in time when the first contact information 1011 is received), or tag information being configured for a preconfigured number or more pieces of contact information among the multiple pieces of contact information stored in the electronic device 210.

According to various embodiments of the disclosure, in operation 815, the electronic device 210 may provide contact information remaining after excluding the at least one piece of fourth contact information from among the multiple pieces of third contact information, and the multiple pieces of fifth contact information. For example, as a result of the classification, the electronic device 210 may provide contact information including tag identifiers via the contact information application. When the contact application is executed as illustrated in FIG. 9B, the electronic device 210 may display a screen including objects 940 corresponding to the contact information. When one object among the objects 940 is selected, the electronic device 210 may display a screen (e.g., reference numeral 904, 905, or 906 in FIG. 9B) including data for each parameter included in the object. The screen may include a single data for the parameter that is a reference for classification, but may include multiple data for some remaining parameters. In an embodiment of the disclosure, when contact information is classified based on phone number and name, the electronic device 210 may display, as illustrated in reference numeral 904 of FIG. 9B, a screen corresponding to the contact information in accordance with the selected object including a single data 904*a* and a single data 904*b* for the parameters 381 and 383 of name and phone number. In another embodiment of the disclosure, when contact information is classified based on name, the electronic device 210 may display, as illustrated in reference numeral 905 of FIG. 9B, a screen corresponding to the contact information in accordance with the selected object, which includes a single data 905*a* for the parameter 381 of name, while including multiple data 905*b* and 905*c* for another parameter 383 (e.g., phone number). In another embodiment of the disclosure, when contact information is classified based on phone number, the electronic device 210 may display, as illustrated in reference numeral 906 of FIG. 9B, a screen corresponding to the contact information in accordance with the selected object, which includes a single data 906*c* for the parameter 383 of phone number, while including multiple data 906*a* and 906*b* for another parameter 381 (e.g., name). Accordingly, the electronic device 210 may identify only contact information having some tag identifiers without a need to process all contact information, so that an operational burden for processing contact information of the electronic device 210 can be reduced, and efficiency of providing contact information of the electronic device 210 can be improved.

Hereinafter, an example of operations of the electronic device 210 according to various embodiments will be described. Since at least some of the aforementioned operations (e.g., the operation of the flowchart 400 of FIG. 4 and the operation of the flowchart 800 of FIG. 8) of the electronic device 210 and the operations described below may be performed in combination, redundant descriptions will be skipped.

According to various embodiments of the disclosure, the electronic device 210 may identify specific temporary contact information, which includes multiple data for a parameter selected by a user, from temporary contact information stored according to recovery of information (e.g., contact information), and may generate multiple pieces of contact information based on the identified specific temporary contact information (or separate the identified specific temporary contact information into multiple pieces of contact information).

FIG. 11 is a flowchart 1100 for illustrating an operation of an electronic device according to an embodiment of the disclosure.

Referring to FIG. 11, according to various embodiments of the disclosure, the operations illustrated in FIG. 11 are not limited to the illustrated sequence and may be performed in various sequences. According to various embodiments of the disclosure, more operations than those illustrated in FIG. 11 or at least one operation fewer than those thereof may be performed.

According to various embodiments of the disclosure, the electronic device 210 may acquire multiple pieces of first contact information 1011 from an external device via the communication circuit 310 in operation 1101, may acquire multiple pieces of second contact information 1013 stored in the SIM card 321 via the interface in operation 1103, and may acquire multiple pieces of third contact information, based on the multiple pieces of first contact information

1011 and the multiple pieces of second contact information 1013, and identify multiple pieces of tag information corresponding to the multiple pieces of third contact information, in operation 1105. For example, the electronic device 210 may acquire multiple pieces of contact information received from multiple storage media (e.g., the external electronic device 220, the SIM card 321, and the server 230), and may integrate contact information having some identical data from among the multiple pieces of contact information. Based on a result of performing the integration, the electronic device 210 may generate tag information corresponding to the acquired multiple pieces of contact information (e.g., multiple pieces of temporary contact information). The tag information may be included in the multiple pieces of contact information (e.g., multiple pieces of temporary contact information) or may be stored in a form associated with the multiple pieces of contact information. Since operation 1101 to operation 1105 of the electronic device 210 may be performed in the same manner as aforementioned operation 801 to operation 807 of the electronic device 210, redundant description will be skipped.

According to various embodiments of the disclosure, in operation 1107, the electronic device 210 may receive a user's input for selecting a first parameter. For example, the electronic device 210 may receive a selection of the user for at least one parameter (e.g., name, phone number, and name and phone number) to be a reference for classification, based on a contact application. Since operation 1107 of the electronic device 210 may be performed in the same manner as aforementioned operation 809 of the electronic device 210, redundant description will be skipped.

According to various embodiments of the disclosure, the electronic device 210 may identify, in operation 1109, at least one piece of first tag information, which indicates that data of the first parameter is different, from among multiple pieces of tag information, and may generate multiple pieces of contact information in operation 1111, based on at least one piece of temporary contact information corresponding to the identified at least one piece of first tag information from among the multiple pieces of temporary contact information. For example, the electronic device 210 may identify tag information indicating that there are multiple data for the selected parameter (e.g., name, phone number, and name and phone number). The electronic device 210 may generate multiple pieces of contact information, based on temporary contact information corresponding to the identified tag information from among the multiple pieces of temporary contact information. The electronic device 210 may generate tag identifiers corresponding to the multiple pieces of contact information. Since operation 1109 and operation 1111 of the electronic device 210 may be performed in the same manner as at least some of aforementioned operation 811, operation 813, and operation 815 of the electronic device 210, redundant description will be skipped.

Hereinafter, an example of operations of the electronic device 210 according to various embodiments will be described. Since at least some of the aforementioned operations (e.g., the operation of the flowchart 400 of FIG. 4, the flowchart 800 of FIG. 8, and the operation of the flowchart 1100 of FIG. 11) of the electronic device 210 and the operations described below may be performed in combination, redundant descriptions will be skipped.

According to various embodiments of the disclosure, the electronic device 210 may acquire contact information satisfying a designated condition from among the multiple pieces of contact information, and may classify the acquired contact information. The designated condition may include a recovered time being included in a designated time interval.

FIG. 12 is a flowchart 1200 for illustrating an operation of an electronic device according to an embodiment of the disclosure.

Referring to FIG. 12, according to various embodiments of the disclosure, the operations illustrated in FIG. 12 are not limited to the illustrated sequence and may be performed in various sequences. According to various embodiments of the disclosure, more operations than those illustrated in FIG. 12 or at least one operation fewer than those thereof may be performed. Hereinafter, FIG. 12 will be described with reference to FIG. 13.

Figure 13:
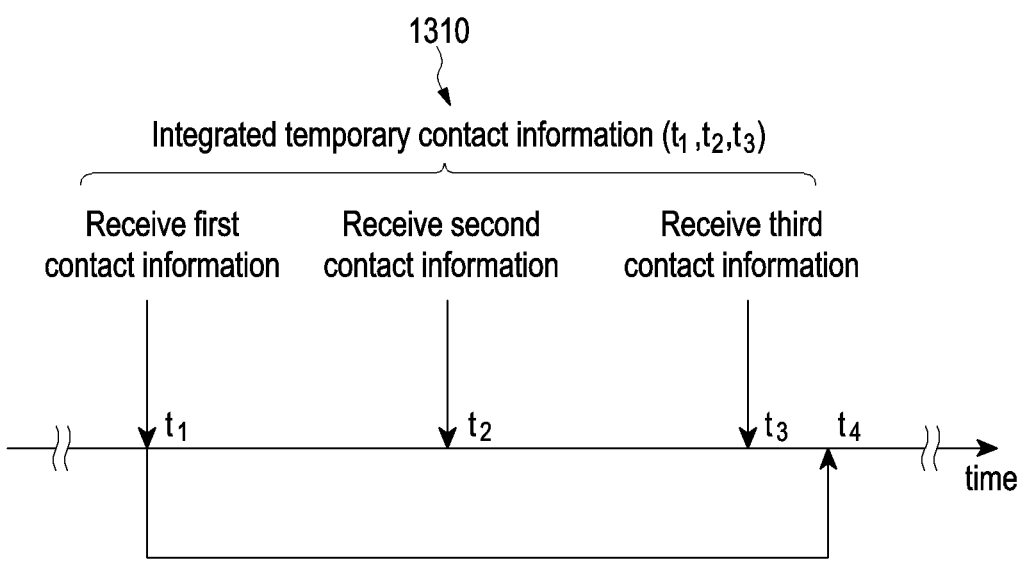
FIG. 13 is a diagram illustrating an operation for identifying contact information satisfying a designated condition of an electronic device according to an embodiment of the disclosure.

FIG. 13 is a diagram illustrating an operation for identifying contact information satisfying a designated condition of an electronic device according to an embodiment of the disclosure.

Referring to FIG. 13, according to various embodiments of the disclosure, the electronic device 210 may acquire, in operation 1201, multiple pieces of first contact information from an external device via the communication circuit 310, and may acquire, in operation 1203, multiple pieces of second contact information stored in the SIM card 321 via an interface. For example, the electronic device 210 may acquire contact information from different storage media (e.g., two storage media among the external electronic device 220, the storage device, and/or the server 230). Since operation 1201 and operation 1203 of the electronic device 210 may be performed in the same manner as aforementioned operation 801 and operation 803 of the electronic device 210, redundant description will be skipped.

According to various embodiments of the disclosure, in operation 1205, the electronic device 210 may acquire multiple pieces of third contact information, based on the multiple pieces of first contact information and the multiple pieces of second contact information, and may identify multiple pieces of tag information corresponding to the multiple pieces of third contact information. For example, the electronic device 210 may integrate contact information having some identical data from among the multiple pieces of contact information received from the multiple storage devices (e.g., the external electronic device 220, the storage device, and the server 230). Based on a result of performing the integration, the electronic device 210 may generate tag information corresponding to the acquired multiple pieces of contact information (e.g., multiple pieces of temporary contact information). The tag information may be included in the multiple pieces of contact information (e.g., multiple pieces of temporary contact information) or may be stored in a form associated with the multiple pieces of contact information. Since operation 1205 of the electronic device 210 may be performed in the same manner as aforementioned operation 805 and operation 807 of the electronic device 210, redundant description will be skipped.

According to various embodiments of the disclosure, in operation 1207, the electronic device 210 may identify multiple pieces of fourth contact information satisfying a designated condition from among the multiple pieces of third contact information.

In an embodiment of the disclosure, the electronic device 210 may identify recovery times corresponding to some temporary contact information among the multiple pieces of temporary contact information, and may identify, when the identified recovery times are included in a specific time interval, that some temporary contact information satisfies the designated condition. For example, the multiple pieces of temporary contact information (e.g., integrated temporary contact information) may further include data on a recovered time as a parameter. As an example, the temporary contact information (e.g., integrated temporary contact information) generated as a result of integrating the multiple pieces of contact information may include data 1310 of the recovered time (t1, t2, or t3) for each of the multiple pieces of contact information (e.g., the first contact information, the second contact information, and third contact information). In another example, temporary contact information, which does not include data identical to that of other contact information, may include data on a time at which contact information is recovered. Referring to FIG. 13, the specific time interval may refer to a time interval (e.g., a time interval from t1 to t4) within a designated period from a time point (t1) at which contact information (e.g., the first contact information) is first recovered in the electronic device 210. The electronic device 210 may determine whether the time (e.g., t1, t2, or t3) included in data (e.g., the data 1310 indicating t1, t2, or t3) for the recovered time associated with each piece of the temporary contact information is included in the specific time interval (e.g., the time interval from t1 to t4), and may identify that temporary contact information having data for the recovered time included in the specific time interval satisfies the specified condition.

In another embodiment of the disclosure, the electronic device 210 may acquire tag information corresponding to some temporary contact information among the multiple pieces of temporary contact information, and may identify, when the tag information includes values associated with all the storage media (e.g., the external electronic device 220, the storage device 323, and the server 230), that some temporary contact information satisfies the designated condition.

According to various embodiments of the disclosure, in operation 1209, the electronic device 210 may classify the multiple pieces of fourth contact information. For example, the electronic device 210 may separate, into multiple pieces of contact information, contact information associated with a parameter selected by a user from among the identified multiple pieces of fourth contact information (e.g., some temporary contact information identified as satisfying the designated condition), may acquire contact information unassociated with the selected parameter, and may generate a tag identifier corresponding to each piece of contact information. Since operation 1209 of the electronic device 210 may be performed in the same manner as aforementioned operation 815 of the electronic device 210, redundant description will be skipped.

Hereinafter, an example of operations of the electronic device 210 according to various embodiments will be described. Since at least some of the aforementioned operations (e.g., the operation of the flowchart 400 of FIG. 4, the flowchart 800 of FIG. 8, the operation of the flowchart 1100 of FIG. 11, and the operation of the flowchart 1200 of FIG. 12) of the electronic device 210 and the operations described below may be performed in combination, redundant descriptions will be skipped.

According to various embodiments of the disclosure, the electronic device 210 may provide at least one piece of information, based on multiple pieces of temporary contact information stored in the memory 350.

FIG. 14 is a flowchart 1400 for illustrating an operation of an electronic device according to an embodiment of the disclosure.

Referring to FIG. 14, according to various embodiments of the disclosure, the operations illustrated in FIG. 14 are not limited to the illustrated sequence and may be performed in various sequences. According to various embodiments of the disclosure, more operations than those illustrated in FIG. 14 or at least one operation fewer than those thereof may be performed. Hereinafter, FIG. 14 will be described with reference to FIGS. 15A and 15B.

Figure 15A:
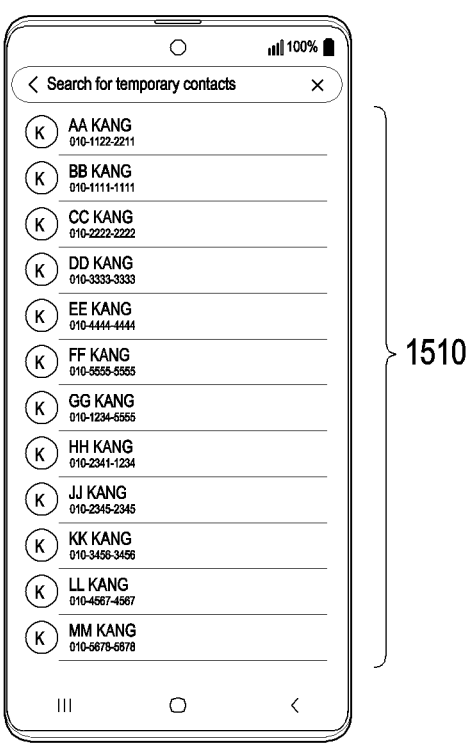
FIG. 15A is a diagram illustrating an operation for providing temporary contact information of an electronic device according to an embodiment of the disclosure.

FIG. 15A is a diagram illustrating an operation for providing temporary contact information of an electronic device according to an embodiment of the disclosure.

Figure 15B:
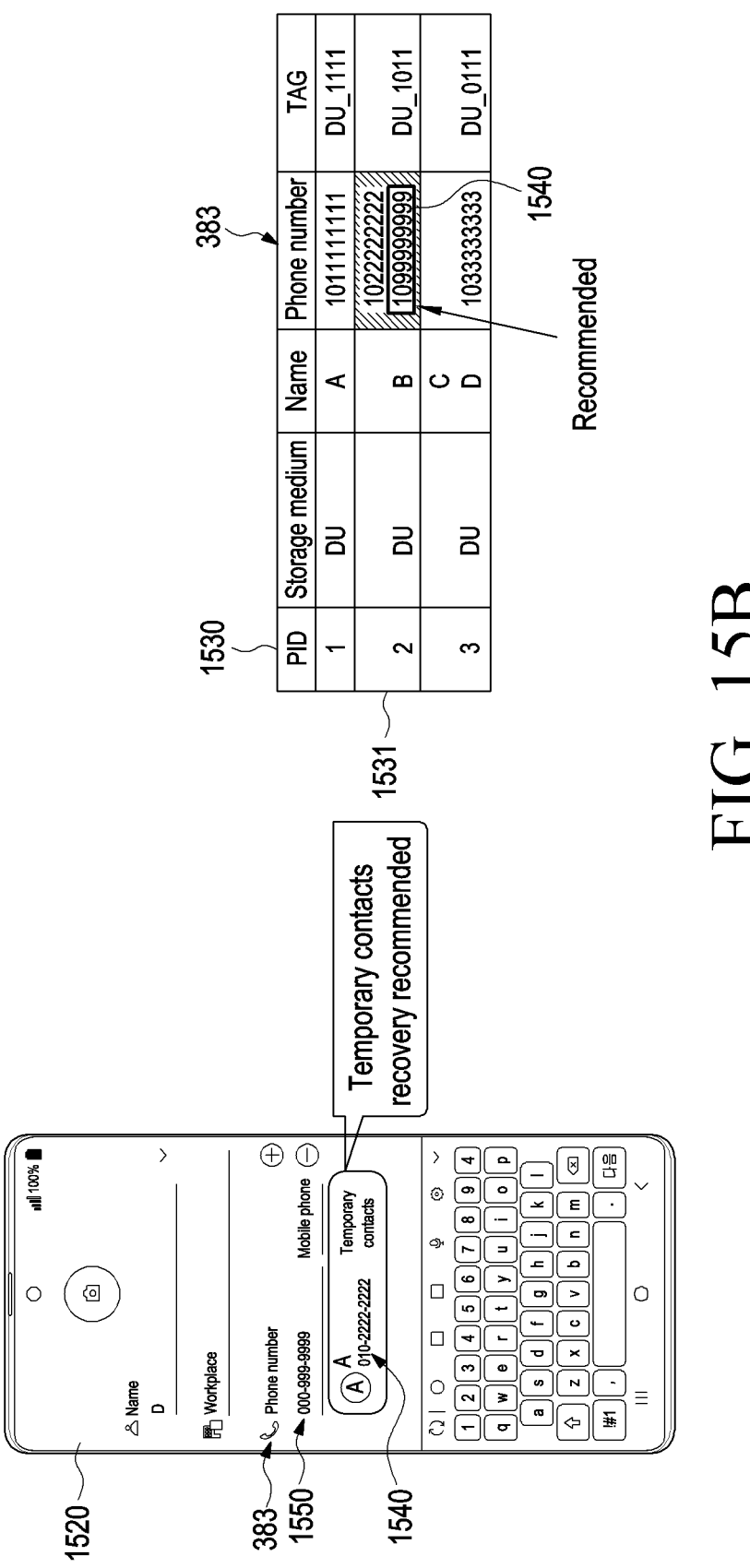
FIG. 15B is a diagram illustrating an operation for providing recommended information, based on temporary contact information of an electronic device according to an embodiment of the disclosure.

FIG. 15B is a diagram illustrating an operation for providing recommended information, based on temporary contact information of an electronic device according to an embodiment of the disclosure.

Referring to FIGS. 15A and 15B, according to various embodiments of the disclosure, the electronic device 210 may acquire multiple pieces of first contact information in operation 1401, may acquire multiple pieces of second contact information in operation 1403, and in operation 1405, may acquire multiple pieces of contact information by integrating some contact information including redundant data among the multiple pieces of first contact information and the multiple pieces of second contact information, and acquire multiple pieces of tag information. For example, the electronic device 210 may acquire multiple pieces of contact information received from multiple storage media (e.g., the external electronic device 220, the SIM card 321, and the server 230), and may integrate contact information having some identical data from among the multiple pieces of contact information. Based on a result of performing the integration, the electronic device 210 may generate tag information corresponding to the acquired multiple pieces of contact information (e.g., multiple pieces of temporary contact information). The tag information may be included in the multiple pieces of contact information (e.g., multiple pieces of temporary contact information) or may be stored in a form associated with the multiple pieces of contact information. Since operation 1401 to operation 1405 of the electronic device 210 may be performed in the same manner as aforementioned operation 801 to operation 807 of the electronic device 210, redundant description will be skipped.

According to various embodiments of the disclosure, the electronic device 210 may determine, in operation 1407, whether it is configured to store temporary contacts, and if it is determined that the temporary contacts are configured to be stored, the electronic device 210 may provide at least one piece of information in operation 1409, based on multiple pieces of contact information stored in the memory 350. For example, as illustrated in reference numeral 903 of FIG. 9A, when receiving an input of selecting an object from among the second objects 933, the object being implemented to classify multiple pieces of temporary contact information based on a specific parameter and then configure to maintain the multiple pieces of temporary contact information, the electronic device 210 may determine that it has been configured to store the temporary contacts. Based on the configuration, the electronic device 210 may provide at least some of the multiple pieces of temporary contact information stored in the memory 350 on an execution screen of the contact application. In an embodiment of the disclosure, as illustrated in FIG. 15A, the electronic device 210 may provide a screen including multiple objects 1510 corresponding to the multiple pieces of temporary contact information stored in the memory 350, and may provide temporary contact information corresponding to a specific object when the specific object is selected from among the multiple objects 1510. Since contact information providing of the electronic device 210 has been described above with reference to FIG. 9B, redundant description will be skipped. In another embodiment of the disclosure, as illustrated in FIG. 15B, the electronic device 210 may provide recommended information on the execution screen of the contact application. For example, the electronic device 210 may acquire data 1550 (e.g., "01022222222") for a specific parameter (e.g., the parameter 383 for phone number) via a specific data input field on a screen 1520 of the contact application, for inputting contact information. The electronic device 210 may identify temporary contact information 1531 having the input data 1550 (e.g., "01022222222") for the specific parameter 383 from among multiple pieces of temporary contact information 1530 stored in the memory 350, and when the identified temporary contact information 1531 includes data 1540 (e.g., "01099999999") other than the input data 1550 (e.g., "01022222222") for the specific parameter 383, the electronic device 210 may display the other data 1540 (e.g., "01099999999") on the execution screen. When the displayed other data is selected, the electronic device 210 may automatically input the other data 1540 (e.g., "01099999999") to the specific data input field.

According to various embodiments of the disclosure, an electronic device (e.g., the electronic device 210 of FIG. 2) may be provided, the electronic device (e.g., the electronic device 210 of FIG. 2) including at least one communication circuit, an interface configured to be connected to a SIM card (e.g., the SIM card 321 of FIG. 3A) and/or a storage device (e.g., the storage device 323 of FIG. 3A) loaded in the electronic device (e.g., the electronic device 210 of FIG. 2), at least one processor (e.g., the processor 340 of FIG. 3A) operatively connected to the at least one communication circuit (e.g., the communication circuit 310 of FIG. 3A) and the interface, and memory (e.g., the memory 350 of FIGS. 3A and 3B), wherein, instructions stored in the memory (e.g., the memory 350 of FIGS. 3A and 3B) are configured to, when executed, cause the at least one processor (e.g., the processor 340 of FIG. 3A) is configured to receive a plurality of pieces of first contact information from an external device via the at least one communication circuit, identify a plurality of pieces of second contact information stored in the SIM card (e.g., the SIM card 321 of FIG. 3A) via the interface, acquire, based on the plurality of pieces of first contact information and the plurality of pieces of second contact information, a plurality of pieces of third contact information, wherein the pieces of third contact information include at least one piece of contact information acquired based on contact information including identical data among the plurality of pieces of first contact information and the plurality of pieces of second contact information, identify a plurality of pieces of tag information corresponding to the plurality of pieces of third contact information, wherein the plurality of pieces of tag information indicate whether each of a plurality of parameters associated with the plurality of pieces of third contact information has a plurality of data, receive an input for selecting a first parameter from among the parameters, identify, among the plurality of pieces of tag information, at least one piece of first tag information indicating that the first parameter has a plurality of data, acquire a plurality of pieces of fifth contact information, based on at least one piece of fourth contact information corresponding to the at least one piece of first tag information from among the plurality of pieces of third contact information, and provide contact information remaining after excluding the at least one piece of fourth contact information from among the plurality of pieces of third contact information, and the plurality of pieces of fifth contact information.

According to various embodiments of the disclosure, the electronic device (e.g., the electronic device 210 of FIG. 2) may be provided, wherein the plurality of parameters include at least one of the first parameter corresponding to name or a second parameter corresponding to phone number.

According to various embodiments of the disclosure, the electronic device (e.g., the electronic device 210 of FIG. 2) may be provided, wherein the at least one processor (e.g., the processor 340 of FIG. 3A) is configured to execute an application for recovering contact information, and based on executing the application, receive the plurality of pieces of first contact information from an external electronic device (e.g., the electronic device 210 FIG. 2) and/or a server via the at least one communication circuit, and acquire the plurality of pieces of second contact information via the interface.

According to various embodiments of the disclosure, the electronic device (e.g., the electronic device 210 of FIG. 2) may be provided, wherein each of the plurality of pieces of first contact information and the plurality of pieces of second contact information includes data for each of the plurality of parameters, and the at least one processor (e.g., the processor 340 of FIG. 3A) is configured to identify the plurality of pieces of contact information, in which the data for at least some specific parameters among the plurality of parameters are identical, from among the plurality of pieces of first contact information and the plurality of pieces of second contact information, acquire the at least one piece of contact information based on the identified pieces of contact information, wherein the at least one piece of contact information includes the identical data for the at least some parameters among the plurality of parameters and includes a plurality of different data for at least some remaining parameters, and acquire sixth contact information remaining after excluding the plurality of pieces of contact information, from among the plurality of pieces of first contact information and the plurality of pieces of second contact information.

According to various embodiments of the disclosure, the electronic device (e.g., the electronic device 210 of FIG. 2) may be provided, wherein the at least one processor (e.g., the processor 340 of FIG. 3A) is configured to generate a plurality of pieces of first tag information corresponding to the plurality of pieces of contact information and a plurality of pieces of second tag information corresponding to the remaining contact information, and the plurality of pieces of first tag information include a value indicating that the at least some remaining parameters have a plurality of data.

According to various embodiments of the disclosure, the electronic device (e.g., the electronic device 210 of FIG. 2) may be provided, wherein the at least one processor (e.g., the processor 340 of FIG. 3A) is configured to determine whether a designated condition for acquiring of the plurality of pieces of fifth contact information is satisfied, wherein satisfying of the designated condition includes at least one of a current time corresponding to a specific time or receiving an input of a user of the electronic device (e.g., the electronic device 210 of FIG. 2), for acquiring the plurality of pieces of fifth contact information, and when it is determined that the designated condition is satisfied, acquire the plurality of pieces of fifth contact information.

According to various embodiments of the disclosure, the electronic device (e.g., the electronic device 210 of FIG. 2) may be provided, wherein the external device includes an external electronic device (e.g., the electronic device 210 of FIG. 2) associated with the user of the electronic device (e.g., the electronic device 210 of FIG. 2), and a server, and the at least one processor (e.g., the processor 340 of FIG. 3A) is configured to determine whether the plurality of pieces of tag information include values for the external electronic device (e.g., the electronic device 210 of FIG. 2), the server, and the SIM card (e.g., the SIM card 321 of FIG. 3A), and if the values are included, acquire the plurality of pieces of fifth contact information.

According to various embodiments of the disclosure, the electronic device (e.g., the electronic device 210 of FIG. 2) may be provided, wherein the at least one processor (e.g., the processor 340 of FIG. 3A) is configured to identify a plurality of different data for the first parameter included in at least one piece of fourth contact information corresponding to the at least one piece of first tag information, and generate the plurality of pieces of fifth contact information based on the plurality of data, and each of the plurality of pieces of fifth contact information includes each of the plurality of different data for the first parameter.

According to various embodiments of the disclosure, the electronic device (e.g., the electronic device 210 of FIG. 2) may be provided, wherein the at least one processor (e.g., the processor 340 of FIG. 3A) is configured to generate an identifier corresponding to each of the plurality of pieces of fifth contact information and contact information remaining after excluding the at least one piece of fourth contact information among the plurality of pieces of third contact information, and based on the generated identifier, display an execution screen of a contact application, which includes a plurality of objects corresponding to the plurality of pieces of fifth contact information and the remaining contact information.

According to various embodiments of the disclosure, the electronic device (e.g., the electronic device 210 of FIG. 2) may be provided, wherein the at least one processor (e.g., the processor 340 of FIG. 3A) is configured to, based on a first user input for storing of the plurality of pieces of third contact information, store the plurality of pieces of third contact information in the memory (e.g., the memory 350 of FIGS. 3A and 3B), and after the plurality of pieces of fifth contact information are generated, the plurality of pieces of third contact information are kept stored in the memory (e.g., the memory 350 of FIGS. 3A and 3B), based on the first user input.

According to various embodiments of the disclosure, the electronic device (e.g., the electronic device 210 of FIG. 2) may be provided, wherein the at least one processor (e.g., the processor 340 of FIG. 3A) is configured to display an execution screen of the contact application, which includes a plurality of data input fields corresponding to the plurality of parameters, acquire first data based on a first data input field corresponding to the first parameter from among the plurality of data input fields, identify sixth contact information having the first data from among the plurality of pieces of third contact information, and when the sixth contact information includes second data other than the first data for the first parameter, display the second data on the execution screen of the contact application.

According to various embodiments of the disclosure, a method of operating an electronic device (e.g., the electronic device 210 of FIG. 2) may be provided, the operation method including receiving a plurality of pieces of first contact information from an external device via at least one communication circuit of the electronic device (e.g., the electronic device 210 of FIG. 2), receiving a plurality of pieces of second contact information stored in a SIM card (e.g., the SIM card 321 of FIG. 3A) of the electronic device (e.g., the electronic device 210 of FIG. 2) via an interface of the electronic device (e.g., the electronic device 210 of FIG. 2), acquiring, based on the plurality of pieces of first contact information and the plurality of pieces of second contact information, a plurality of pieces of third contact information, wherein the plurality of pieces of third contact information include at least one piece of contact information acquired based on contact information including identical data among the plurality of pieces of first contact information and the plurality of pieces of second contact information, identifying a plurality of pieces of tag information corresponding to the plurality of pieces of third contact information, wherein the plurality of pieces of tag information indicate whether each of a plurality of parameters associated with the plurality of pieces of third contact information has a plurality of data, identifying an input for selecting a first parameter from among the plurality of parameters, identifying, among the plurality of pieces of tag information, at least one piece of first tag information indicating that the first parameter has a plurality of data, acquiring a plurality of pieces of fifth contact information, based on at least one piece of fourth contact information corresponding to the at least one piece of first tag information from among the plurality of pieces of third contact information, and providing contact information remaining after excluding the at least one piece of fourth contact information from among the plurality of pieces of third contact information, and the plurality of pieces of fifth contact information.

According to various embodiments of the disclosure, the method may be provided, wherein the plurality of parameters include at least one of the first parameter corresponding to a name or a second parameter corresponding to a phone number.

According to various embodiments of the disclosure, the method may be provided, the method including executing an application for recovering contact information, and based on execution of the application, receiving the plurality of pieces of first contact information from an external electronic device (e.g., the electronic device 210 FIG. 2) and/or a server via the at least one communication circuit, and acquiring the plurality of pieces of second contact information via the interface.

According to various embodiments of the disclosure, the method may be provided, wherein each of the plurality of pieces of first contact information and the plurality of pieces of second contact information includes data for each of the plurality of parameters, and the method includes identifying the plurality of pieces of contact information, in which the data for at least some specific parameters among the plurality of parameters are identical, from among the plurality of pieces of first contact information and the plurality of pieces of second contact information, acquiring the at least one piece of contact information based on the identified a plurality of pieces of contact information, wherein the at least one piece of contact information includes the identical data for the at least some parameters among the plurality of parameters and includes a plurality of different data for at least some remaining parameters, and acquiring sixth contact information remaining after excluding the plurality of pieces of contact information, from among the plurality of pieces of first contact information and the plurality of pieces of second contact information.

According to various embodiments of the disclosure, the method may be provided, the method including generating a plurality of pieces of first tag information corresponding to the plurality of pieces of contact information and a plurality of pieces of second tag information corresponding to the remaining contact information, wherein the plurality of pieces of first tag information include a value indicating that the at least some remaining parameters have a plurality of data.

According to various embodiments of the disclosure, the method may be provided, the method including determining whether a designated condition for acquiring of the plurality of pieces of fifth contact information is satisfied, wherein satisfying of the designated condition includes at least one of a current time corresponding to a specific time or receiving an input of a user of the electronic device (e.g., the electronic device 210 of FIG. 2), for acquiring the plurality of pieces of fifth contact information, and when it is determined that the designated condition is satisfied, acquiring the plurality of pieces of fifth contact information.

According to various embodiments of the disclosure, the method may be provided, wherein the external device includes an external electronic device (e.g., the electronic device 210 of FIG. 2) associated with the user of the electronic device (e.g., the electronic device 210 of FIG. 2), and a server, and the method includes determining whether the plurality of pieces of tag information include values for the external electronic device (e.g., the electronic device 210 of FIG. 2), the server, and the SIM card (e.g., the SIM card 321 of FIG. 3A), and if the values are included, acquiring the plurality of pieces of fifth contact information.

According to various embodiments of the disclosure, the method may be provided, the method including identifying a plurality of different data for the first parameter included in at least one piece of fourth contact information corresponding to the at least one piece of first tag information, and generating the plurality of pieces of fifth contact information based on the plurality of data, wherein each of the plurality of pieces of fifth contact information includes each of the multiple different data for the first parameter.

According to various embodiments of the disclosure, an electronic device (e.g., the electronic device 210 of FIG. 2) may be provided, the electronic device (e.g., the electronic device 210 of FIG. 2) including at least one communication circuit, an interface configured to be connected to a SIM card (e.g., the SIM card 321 of FIG. 3A) and/or a storage device (e.g., the storage device 323 of FIG. 3A) card loaded in the electronic device (e.g., the electronic device 210 of FIG. 2), at least one processor (e.g., the processor 340 of FIG. 3A) operatively connected to the at least one communication circuit and the interface, and memory (e.g., the memory 350 of FIGS. 3A and 3B), wherein, instructions stored in the memory (e.g., the memory 350 of FIGS. 3A and 3B) are configured to, when executed, cause the at least one processor (e.g., the processor 340 of FIG. 3A) is configured to acquire, based on the at least one communication circuit and the SIM card (e.g., the SIM card 321 of FIG. 3A), a plurality of pieces of contact information, identify, among the plurality of pieces of contact information, first contact information including a plurality of different data corresponding to a specific parameter selected by a user, acquire a plurality of pieces of second contact information including the respective plurality of different data included in the identified first contact information, and provide the plurality of pieces of second contact information.

According to various embodiments, a non-transitory computer readable medium storing at least one instruction, wherein the at least one instruction, when executed by at least one processor (e.g., the processor 340 of FIG. 3) of an electronic device (e.g., the electronic device 210 of FIG. 2), causes the electronic device to perform at least one operation, the at least one operation comprising, receiving a plurality of pieces of first contact information from an external device via at least one communication circuit of the electronic device, receiving a plurality of pieces of second contact information stored in a SIM card (e.g., the SIM card 231 of FIG. 3) of the electronic device via an interface of the electronic device, based on the plurality of pieces of first contact information and the plurality of pieces of second contact information, acquiring a plurality of pieces of third contact information, wherein the plurality of pieces of third contact information comprise at least one piece of contact information acquired based on contact information comprising identical data among the plurality of pieces of first contact information and the plurality of pieces of second contact information, identifying a plurality of pieces of tag information corresponding to the plurality of pieces of third contact information, wherein the plurality of pieces of tag information indicate whether each of a plurality of parameters associated with the plurality of pieces of third contact information has a plurality of data identifying an input for selecting a first parameter from among the plurality of parameters, identifying, among the plurality of pieces of tag information, at least one piece of first tag information indicating that the first parameter has a plurality of data, acquiring a plurality of pieces of fifth contact information, based on at least one piece of fourth contact information corresponding to the at least one piece of first tag information from among the plurality of pieces of third contact information, and providing contact information remaining after excluding the at least one piece of fourth contact information from among the plurality of pieces of third contact information, and the plurality of pieces of fifth contact information.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
at least one communication circuit;
an interface configured to be connected to a subscriber identification module (SIM) card and/or a storage device loaded in the electronic device;
at least one processor operatively connected to the at least one communication circuit and the interface; and
memory storing instructions that, when executed by the at least one processor, cause the electronic device to:
receive, via the at least one communication circuit, a plurality of pieces of first contact information from an external device,
identify, via the interface, a plurality of pieces of second contact information stored in the SIM card,
based on the plurality of pieces of first contact information and the plurality of pieces of second contact information, acquire a plurality of pieces of third contact information, wherein the plurality of pieces of third contact information comprise at least one piece of contact information acquired based on contact information comprising identical data among the plurality of pieces of first contact information and the plurality of pieces of second contact information,
identify a plurality of pieces of tag information corresponding to the plurality of pieces of third contact information, wherein the plurality of pieces of tag information indicate whether each of a plurality of parameters associated with the plurality of pieces of third contact information has a plurality of data;
receive an input for selecting a first parameter from among the plurality of parameters,
identify, among the plurality of pieces of tag information, at least one piece of first tag information indicating that the first parameter has a plurality of data,
acquire a plurality of pieces of fifth contact information, based on at least one piece of fourth contact information corresponding to the at least one piece of first tag information from among the plurality of pieces of third contact information, and
provide contact information remaining after excluding the at least one piece of fourth contact information from among the plurality of pieces of third contact information, and the plurality of pieces of fifth contact information.

2. The electronic device of claim 1, wherein the plurality of parameters comprise at least one of the first parameter corresponding to a name or a second parameter corresponding to a phone number.

3. The electronic device of claim 1, wherein the instructions, when executed by the at least one processor, cause the electronic device to:
execute an application for recovering contact information, and
based on executing the application, receive, via the at least one communication circuit, the plurality of pieces of first contact information from an external electronic device and/or a server, and acquire, via the interface, the plurality of pieces of second contact information.

4. The electronic device of claim 3,
wherein each of the plurality of pieces of first contact information and the plurality of pieces of second contact information comprises data for each of the plurality of parameters, and
wherein the instructions, when executed by the at least one processor, cause the electronic device to:
identify a plurality of pieces of contact information, in which the data for at least some specific parameters among the plurality of parameters are identical, from among the plurality of pieces of first contact information and the plurality of pieces of second contact information,
based on the identified plurality of pieces of contact information, acquire the at least one piece of contact information, wherein the at least one piece of contact information comprises the identical data for the at least some specific parameters among the plurality of parameters and comprises a plurality of different data for at least some remaining parameters, and
acquire sixth contact information remaining after excluding the plurality of pieces of contact information, from among the plurality of pieces of first contact information and the plurality of pieces of second contact information.

5. The electronic device of claim 4,
wherein the instructions, when executed by the at least one processor, cause the electronic device to:
generate a plurality of pieces of first tag information corresponding to the plurality of pieces of contact information and a plurality of pieces of second tag information corresponding to remaining contact information, and wherein the plurality of pieces of first tag information comprise a value indicating that the at least some remaining parameters have plurality of data.

6. The electronic device of claim 1, wherein the instructions, when executed by the at least one processor, cause the electronic device to:
determine whether a designated condition for acquiring of the plurality of pieces of fifth contact information is satisfied, wherein satisfying of the designated condition comprises at least one of a current time corresponding to a specific time, or receiving an input of a user of the electronic device, for acquiring the plurality of pieces of fifth contact information, and
when the designated condition is determined to be satisfied, acquire the plurality of pieces of fifth contact information.

7. The electronic device of claim 6,
wherein the external device comprises an external electronic device associated with the user of the electronic device, and a server, and
wherein the instructions, when executed by the at least one processor, cause the electronic device to:
determine whether the plurality of pieces of tag information include values for the external electronic device, the server, and the SIM card, and
when the values are included, acquire the plurality of pieces of fifth contact information.

8. The electronic device of claim 1, wherein the instructions, when executed by the at least one processor, cause the electronic device to:
identify a plurality of different data for the first parameter included in at least one piece of fourth contact information corresponding to the at least one piece of first tag information, and
based on the plurality of data, generate the plurality of pieces of fifth contact information, wherein each of the plurality of pieces of fifth contact information comprises each of the plurality of different data for the first parameter.

9. The electronic device of claim 8, wherein the instructions, when executed by the at least one processor, cause the electronic device to:
generate an identifier corresponding to each of the plurality of pieces of fifth contact information and contact information remaining after excluding the at least one piece of fourth contact information among the plurality of pieces of third contact information, and
based on the generated identifier, display an execution screen of a contact application, which comprises a plurality of objects corresponding to the plurality of pieces of fifth contact information and remaining contact information.

10. The electronic device of claim 9,
wherein the instructions, when executed by the at least one processor, cause the electronic device to:
based on a first user input for storing of the plurality of pieces of third contact information, store the plurality of pieces of third contact information in the memory, and
wherein after the plurality of pieces of fifth contact information are generated, the plurality of pieces of third contact information are kept stored in the memory, based on the first user input.

11. The electronic device of claim 10, wherein the instructions, when executed by the at least one processor, cause the electronic device to:

display an execution screen of the contact application, which comprises a plurality of data input fields corresponding to the plurality of parameters,
acquire first data, based on a first data input field corresponding to the first parameter from among the plurality of data input fields,
identify sixth contact information including the first data from among the plurality of pieces of third contact information, and
when the sixth contact information comprises second data other than the first data for the first parameter, display the second data on the execution screen of the contact application.

12. A method of operating an electronic device, the method comprising:
receiving a plurality of pieces of first contact information from an external device via at least one communication circuit of the electronic device;
receiving a plurality of pieces of second contact information stored in a subscriber identification module (SIM) card of the electronic device via an interface of the electronic device;
based on the plurality of pieces of first contact information and the plurality of pieces of second contact information, acquiring a plurality of pieces of third contact information, wherein the plurality of pieces of third contact information comprise at least one piece of contact information acquired based on contact information comprising identical data among the plurality of pieces of first contact information and the plurality of pieces of second contact information;
identifying a plurality of pieces of tag information corresponding to the plurality of pieces of third contact information, wherein the plurality of pieces of tag information indicate whether each of a plurality of parameters associated with the plurality of pieces of third contact information has a plurality of data;
identifying an input for selecting a first parameter from among the plurality of parameters;
identifying, among the plurality of pieces of tag information, at least one piece of first tag information indicating that the first parameter has a plurality of data;
acquiring a plurality of pieces of fifth contact information, based on at least one piece of fourth contact information corresponding to the at least one piece of first tag information from among the plurality of pieces of third contact information; and
providing contact information remaining after excluding the at least one piece of fourth contact information from among the plurality of pieces of third contact information, and the plurality of pieces of fifth contact information.

13. The method of claim 12, wherein the plurality of parameters comprise at least one of the first parameter corresponding to a name or a second parameter corresponding to a phone number.

14. The method of claim 12, further comprising:
executing an application for recovering contact information; and
based on executing the application, receiving the plurality of pieces of first contact information from an external electronic device and/or a server via the at least one communication circuit, and acquiring the plurality of pieces of second contact information via the interface.

15. The method of claim 14, wherein each of the plurality of pieces of first contact information and the plurality of pieces of second contact information comprises data for each of the plurality of parameters, and wherein the method further comprising:

identifying the plurality of pieces of contact information, in which the data for at least some specific parameters among the plurality of parameters are identical, from among the plurality of pieces of first contact information and the plurality of pieces of second contact information, based on the identified a plurality of pieces of contact information, acquiring the at least one piece of contact information, wherein the at least one piece of contact information comprises the identical data for the at least some specific parameters among the plurality of parameters and comprises a plurality of different data for at least some remaining parameters, and acquiring sixth contact information remaining after excluding the plurality of pieces of contact information, from among the plurality of pieces of first contact information and the plurality of pieces of second contact information.

16. The method of claim 15, further comprising:

generating a plurality of pieces of first tag information corresponding to the plurality of pieces of contact information and a plurality of pieces of second tag information corresponding to remaining contact information, and wherein the plurality of pieces of first tag information comprise a value indicating that the at least some remaining parameters have plurality of data.

17. The method of claim 12, further comprising:

determining whether a designated condition for acquiring of the plurality of pieces of fifth contact information is satisfied, wherein satisfying of the designated condition comprises at least one of a current time corresponding to a specific time, or receiving an input of a user of the electronic device, for acquiring the plurality of pieces of fifth contact information; and when the designated condition is determined to be satisfied, acquiring the plurality of pieces of fifth contact information.

18. The method of claim 17, wherein the external device comprises an external electronic device associated with the user of the electronic device, and a server, and wherein the method further comprises:

determining whether the plurality of pieces of tag information include values for the external electronic device, the server, and the SIM card; and when the values are included, acquiring the plurality of pieces of fifth contact information.

19. One or more non-transitory computer-readable storage media storing computer-executable instructions that, when executed by at least one processor of an electronic device, cause the electronic device to perform operations, the operations comprising:

receiving a plurality of pieces of first contact information from an external device via at least one communication circuit of the electronic device;

receiving a plurality of pieces of second contact information stored in a subscriber identification module (SIM) card of the electronic device via an interface of the electronic device;

based on the plurality of pieces of first contact information and the plurality of pieces of second contact information, acquiring a plurality of pieces of third contact information, wherein the plurality of pieces of third contact information comprise at least one piece of contact information acquired based on contact information comprising identical data among the plurality of pieces of first contact information and the plurality of pieces of second contact information;

identifying a plurality of pieces of tag information corresponding to the plurality of pieces of third contact information, wherein the plurality of pieces of tag information indicate whether each of a plurality of parameters associated with the plurality of pieces of third contact information has a plurality of data;

identifying an input for selecting a first parameter from among the plurality of parameters;

identifying, among the plurality of pieces of tag information, at least one piece of first tag information indicating that the first parameter has a plurality of data;

acquiring a plurality of pieces of fifth contact information, based on at least one piece of fourth contact information corresponding to the at least one piece of first tag information from among the plurality of pieces of third contact information; and providing contact information remaining after excluding the at least one piece of fourth contact information from among the plurality of pieces of third contact information, and the plurality of pieces of fifth contact information.

20. The one or more non-transitory computer-readable storage media of claim 19, wherein the plurality of parameters comprise at least one of the first parameter corresponding to a name or a second parameter corresponding to a phone number.

* * * * *